United States Patent
Hwang et al.

(10) Patent No.: US 12,218,368 B2
(45) Date of Patent: Feb. 4, 2025

(54) BATTERY ASSEMBLY AND ELECTRONIC DEVICE INCLUDING THE SAME

(71) Applicant: Samsung Electronics Co., Ltd., Gyeonggi-do (KR)

(72) Inventors: Daum Hwang, Gyeonggi-do (KR); Sangin Baek, Gyeonggi-do (KR); Seunghoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 555 days.

(21) Appl. No.: 17/588,722

(22) Filed: Jan. 31, 2022

(65) Prior Publication Data
US 2022/0247025 A1    Aug. 4, 2022

Related U.S. Application Data

(63) Continuation of application No. PCT/KR2022/000788, filed on Jan. 17, 2022.

(30) Foreign Application Priority Data

Feb. 1, 2021 (KR) .................. 10-2021-0014079

(51) Int. Cl.
*H01M 50/244* (2021.01)
*H01M 50/10* (2021.01)

(52) U.S. Cl.
CPC ......... *H01M 50/244* (2021.01); *H01M 50/10* (2021.01); *H01M 2220/30* (2013.01)

(58) Field of Classification Search
CPC ............. H01M 50/244; H01M 50/264; H01M 50/289; H01M 50/293
See application file for complete search history.

(56) References Cited

U.S. PATENT DOCUMENTS

| 10,084,165 B2 | 9/2018 | Fukushima et al. |
| 11,557,819 B2 * | 1/2023 | Choi ................. H01M 50/231 |

(Continued)

FOREIGN PATENT DOCUMENTS

| CN | 105219286 A | 1/2016 |
| CN | 106165147 A | 11/2016 |

(Continued)

OTHER PUBLICATIONS

International Search Report dated May 16, 2022.
Extended European Search Report dated May 3, 2024.

*Primary Examiner* — Amanda C. Walke
(74) *Attorney, Agent, or Firm* — Cha & Reiter, LLC

(57) ABSTRACT

Disclosed is an electronic device which includes an adhesive member interposed between a housing and a battery and including at least one adhesive layer in absence of a base or substrate, a first adhesive cover member interposed between the adhesive member and the battery, to surround a portion of the battery, such that the first adhesive cover member is detachably attached to the battery, and a second adhesive cover member spaced apart from the first adhesive cover member to surround another portion of the battery. Adhesive force of the adhesive member is stronger than adhesive force of at least one of the first adhesive cover member or the second adhesive cover member, and a partial area of the second adhesive cover member interposed between the battery and the adhesive member may have adhesive force stronger than adhesive force of a remaining area of the second adhesive cover member outside the partial area.

20 Claims, 24 Drawing Sheets

(56) References Cited

U.S. PATENT DOCUMENTS

| | | |
|---|---|---|
| 11,569,540 B2 * | 1/2023 | Gao .................... H01M 50/202 |
| 2017/0033335 A1 | 2/2017 | Kojima et al. |
| 2018/0159097 A1 * | 6/2018 | Fukushima ......... H01M 50/202 |
| 2020/0266399 A1 | 8/2020 | Gao et al. |
| 2021/0203048 A1 * | 7/2021 | Choi ........................ B65C 1/02 |
| 2021/0384583 A1 | 12/2021 | Chung et al. |

FOREIGN PATENT DOCUMENTS

| | | | |
|---|---|---|---|
| CN | 206451750 U | 8/2017 | |
| CN | 214244277 U * | 9/2021 | |
| CN | 114133884 A * | 3/2022 | |
| JP | 2005-56625 A | 3/2005 | |
| JP | 2009-187785 A | 8/2009 | |
| JP | 2017-134887 A | 8/2017 | |
| JP | 2018-92900 A | 6/2018 | |
| KR | 10-2011-0107527 A | 10/2011 | |
| KR | 10-2014-0070260 A | 6/2014 | |
| KR | 10-2020-0019411 A | 2/2020 | |
| KR | 10-2020-0056449 A | 5/2020 | |
| WO | WO-2008098555 A1 * | 8/2008 | .......... H01M 10/613 |
| WO | 2015/186285 A1 | 12/2015 | |
| WO | WO-2017179797 A1 * | 10/2017 | ............. B60R 11/00 |
| WO | WO-2021010615 A1 * | 1/2021 | .......... H01M 10/613 |

* cited by examiner

BATTERY ASSEMBLY AND ELECTRONIC DEVICE INCLUDING THE SAME

CROSS-REFERENCE TO RELATED APPLICATION(S)

This application is a continuation of International Application No. PCT/KR2022/000788 designating the United States, filed on Jan. 17, 2022, in the Korean Intellectual Property Receiving Office and claiming priority to Korean Patent Application No. 10-2021-0014079, filed on Feb. 1, 2021, in the Korean Intellectual Property Office, the disclosure of which is incorporated by reference herein its entirety.

BACKGROUND

Technical Field

One or more embodiments of the instant disclosure generally relate to a battery assembly and an electronic device including the same.

Description of Related Art

With the development of wireless Internet and other communication technologies, portable electronic devices, which are operable by using a battery without a separate power supply, have been extensively used. The portable electronic devices may include a battery so that they are easily portable. The battery may be attached to a housing of the electronic device by using an adhesive member having excellent impact resistance and excellent adhesive performance, such that the battery withstands against external impacts such as drops of the electronic device. The battery may need to be separated from the housing after being fixedly disposed in the housing due to the workflow during the manufacturing process (e.g. when the seating of the battery needs to be repaired or reworked during manufacture of the electronic device) or for repair or maintenance of the device after sale. The battery needs to be configured with a structure that can be easily separated from the rest of the device without influencing or damaging other components of the device.

SUMMARY

The conventional battery may be separated from its housing in various ways, because the battery is attached to the housing of the electronic device using the adhesive member (e.g., adhesive tape, or functional adhesive member).

The conventional battery may be separated from its hosing by using a separating solvent (e.g., the separating liquid) to degrade the adhesive force of the adhesive material included in the adhesive member. The separating solvent may be introduced into at least a portion of the boundary area of the battery in contact with the housing. However, using this separating method, the solvent may flow into another component.

When the battery attached to the housing via the adhesive member is cooled in a low-temperature chamber, molecules inside the adhesive member become solidified such that the adhesive member loses its adhesive property and the battery can be separated from the corresponding interface of the housing. However, when using such a separating method, not just the adhesive member attached to the battery, but also other adhesive members used to fix other components may be solidified, which is not desired.

According to an embodiment of the disclosure, an electronic device may include a housing, a battery disposed inside the housing, an adhesive member interposed between the housing and the battery and including at least one adhesive layer in absence of a base or substrate, a first adhesive cover member interposed between the adhesive member and the battery, to cover a portion of the battery, such that the first adhesive cover member is detachably attached to the battery, and a second adhesive cover member spaced apart from the first adhesive cover member to cover another portion of the battery. Adhesive force of the adhesive member is stronger than adhesive force of at least one of the first adhesive cover member or the second adhesive cover member, and a partial area of the second adhesive cover member interposed between the battery and the adhesive member may have adhesive force stronger than adhesive force of a remaining area of the second adhesive cover member outside the partial area.

According to an embodiment of the disclosure, a battery structure may include a battery including a first surface and a second surface facing each other, a third surface and an opposite fourth surface connecting the first surface and the second surface, and are parallel to each other in a first direction, and a top surface and a bottom surface connecting the first surface and the second surface and are parallel to each other in a second direction different from the first direction, a first adhesive cover member to cover a portion of the battery and configured to be detachably attached to the battery, and a second adhesive cover member spaced apart from the first adhesive cover member to cover another portion of the battery. A partial area of the second adhesive cover member attached to one of the first surface and the second surface of the battery may have adhesive force stronger than adhesive force of a remaining area of the second adhesive cover member outside the partial area, and inner surfaces of the first adhesive cover member and the second adhesive cover member facing at least one of the third surface or the opposite fourth surface of the battery may be non-adhesive surfaces.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

In the following description made with respect to the accompanying drawings, similar components will be assigned with similar reference numerals.

DETAILED DESCRIPTION

Certain embodiments of the disclosure provide a battery structure including a rework member, which is easily separated from the battery, and an electronic device including the same.

According to certain embodiments of the disclosure, the electronic device may reduce the working time of a technician during manufacture or repair by allowing the technician to easily separate the battery from the rework member by taking advantage of the differences between the adhesive member and the rework member.

In addition, according to certain embodiments of the disclosure, the adhesive member is formed without a base or substrate, such that the thickness of the adhesive member is reduced and the impact resistance is improved.

Further, according to certain embodiments of the disclosure, the battery separated from the adhesive member and the rework member may be utilized, such that the cost is reduced and the resources are efficiently used.

In addition, according to certain embodiments of the disclosure, the battery is separated by taking advantage of the differences between the adhesive member and the rework member, thereby preventing other parts of the device from being damaged when the battery is separated.

Further, according to certain embodiments of the disclosure, the adhesive member may be freely formed because a path for solvent flow is not required for the adhesive member.

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
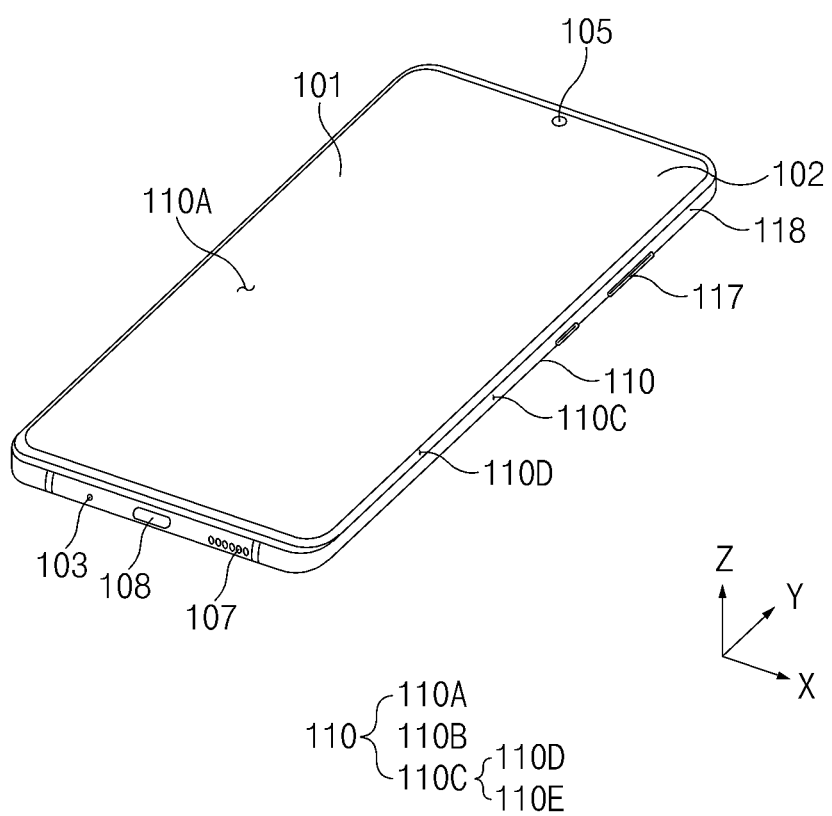
FIG. 1 is a front perspective view illustrating an electronic device, according to an embodiment.
Figure 2:
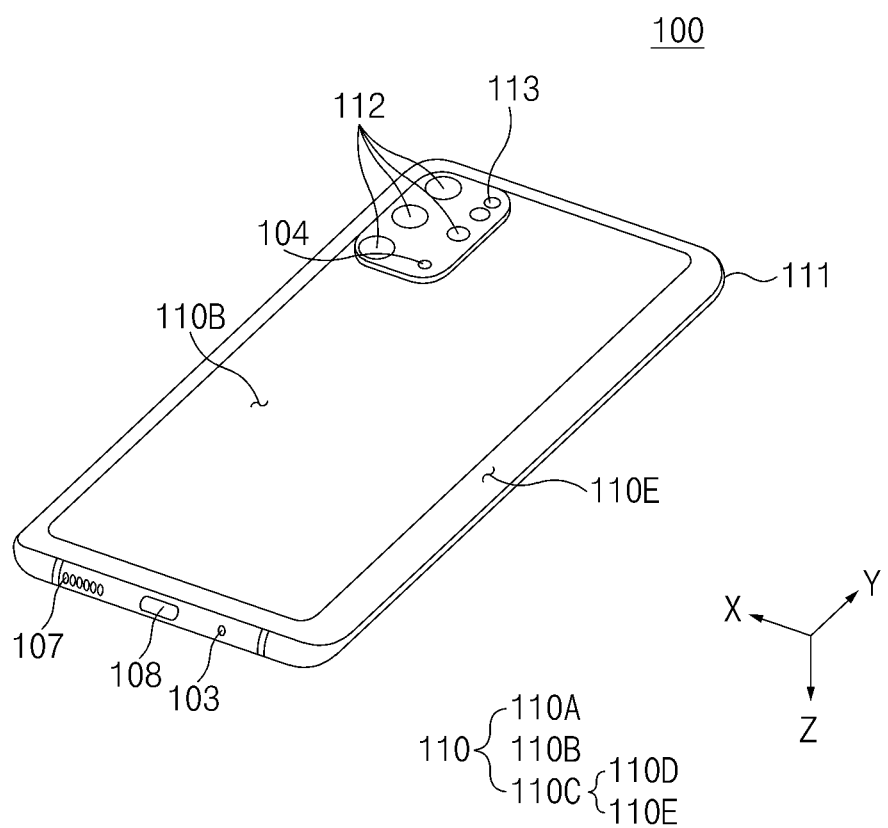
FIG. 2 is a perspective view illustrating a rear surface of an electronic device, according to an embodiment.

FIG. 1 is a front perspective view of an electronic device, according to an embodiment, and FIG. 2 is a rear perspective view of an electronic device, according to an embodiment.

Referring to FIGS. 1 and 2, an electronic device 100 may include a housing 110 including a first surface 110A (or front surface), a second surface 110B (or rear surface), and a side surface 110C surrounding the space between the first surface 110A and the second surface 110B.

According to another embodiment (not illustrated), the housing 110 may refer to the structure forming some of a first surface 110A, a second surface 110B, and side surfaces 110C of FIG. 1.

According to an embodiment, the first surface 110A may include a front plate 102 (e.g., a glass plate or a polymer plate including various coating layers) having at least a portion that is substantially transparent. The second surface 110B may be implemented by a rear plate 111 that is substantially opaque. The rear plate 111 may include, for example, coating or colored glass, ceramic, polymer, metal (e.g., aluminum, stainless steel (STS), or magnesium) or the combination of that least two of the above materials. The side surface 110C may include a frame structure 118 which is coupled to the front plate 102 and the rear plate 111, and includes metal and/or polymer.

According to an embodiment, the rear plate 111 and the frame structure 118 may be formed integrally with each other and may include the same material (e.g., metal material such as aluminum).

According to an embodiment illustrated, the front plate 102 may include two first areas 110D bent toward the rear plate 111 from the first surface 110A while seamlessly extending therefrom, and formed at opposite long edge ends of the front plate 102.

According to an embodiment illustrated, the rear plate 111 may include two second areas 110E which is bent from the second surface 110B toward the front plate 102 while seamlessly extending therefrom, and formed at opposite long edge ends of the rear plate 111.

According to an embodiment, the front plate 102 (or the rear plate 111) may include only one of the first areas 110D (or the second areas 110E). According to another embodiment, the front plate 102 (or the rear plate 111) may include some of the first areas 110D (or the second areas 110E).

According to an embodiment, when viewed from the side surface of the electronic device 100, the frame structure 118 may have a first thickness (or width) at the side surface (e.g., a shorter side) having no first area 110D or second area 110E, and may have a second thickness thinner than the first thickness at the side surface (e.g., a longer side) including the first areas 110D or the second areas 110E.

According to an embodiment, the electronic device 100 may include at least one of a display 101, audio modules 103, 107, and 114, a sensor module (not illustrated), camera modules 105 and 112, a key input device 117, or a connector hole 108. According to an embodiment, the electronic device 100 may include at least one (e.g., the key input device 117) of components or may additionally include another component (e.g., the light emitting device).

According to an embodiment, the display 101 may be exposed through a substantial portion of the front plate 102. According to an embodiment, at least a portion of the display 101 may be exposed through the front plate 102 including the first surface 110A and first areas 110D of the side surface 110C.

According to an embodiment, the edge of the display 101 may be formed substantially identically to the shape of an adjacent outer shape of the front plate 102. According to another embodiment (not illustrated), to expand an area for exposing the display 101, the distance between an outer portion of the display 101 and an outer portion of the front plate 102 may be substantially uniformly formed.

According to an embodiment, the surface (or the front plate 102) of the housing 110 may include a screen display area formed as the display 101 is visually exposed. For example, the screen display area may include the first surface 110A and first areas 110D of the side surface.

According to an embodiment, the screen display areas 110A and 110D may include a sensing area (not illustrated) configured to obtain biometric information of a user. In this case, the term "the screen display areas 110A and 110D may include a sensing area" may be understood as that at least a portion of the sensing area may be overlapped with the screen display areas 110A and 110D. For example, the sensing area may be an area to display visual information by the display 101 and to additionally obtain the biometric information (e.g., a fingerprint) of the user, which is similar to another area of the screen display areas 110A and 11D.

According to an embodiment, the screen display areas 110A and 110D of the display 101 may include an area in which the first camera module 105 (e.g., the punch hole camera) is visually exposed. For example, at least a portion of the area, in which the first camera module 105 (e.g., the punch hole camera) is exposed, may be surrounded by the screen display areas 110A and 110D. According to an embodiment, the first camera module 105 may include a plurality of camera modules.

According to another embodiment (not illustrated), the display 101 may be coupled or disposed adjacent to a touch sensing circuit, a pressure sensor to measure the intensity (pressure) of a touch, and/or a digitizer to detect the stylus pen based on an electromagnetic scheme.

According to an embodiment, the audio modules 103, 104, and 107 may include microphone holes 103 and 104 and a speaker hole 107.

According to an embodiment, a microphone may be disposed in the microphone hole 103 to obtain sounds of the external environment. According to an embodiment, the microphone may include a plurality of microphones to sense the direction of the sound. According to an embodiment, the microphone hole 104 formed in a partial area of the second surface 110B may be disposed to be adjacent to the camera modules 105, 112, and 113. For example, the microphone hole 104 may obtain a sound, when the camera modules 105, 112, and 113 operate or when other functions are performed.

According to an embodiment, the speaker hole 107 may include an external speaker hole and a call receiver hole. According to an embodiment, the speaker hole 107 and the microphone hole 103 may be implemented in the form of one hole.

According to an embodiment, the electronic device 100 may include a speaker to communicate with the speaker hole 107. According to an embodiment, the speaker may include a piezoelectric speaker having no the speaker hole 107.

According to an embodiment, a sensor module (not illustrated) may generate an electrical signal or a data value corresponding to an internal operating state or an external environment state of the electronic device 100. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared sensor, a biometric sensor, a temperature sensor, a humidity sensor, or an illuminance sensor.

According to an embodiment, the camera modules 105, 112 and 113 may include the first camera module 105 (e.g., a punch hole camera) exposed to the first surface 110A of the electronic device 100, and/or the second camera module 112 exposed to the second surface 110B, and/or the flash 113.

According to an embodiment, the first camera module 105 may be exposed through a portion of the screen display areas 110A and 110D of the display 101. For example, the first camera module 105 may be exposed through a portion of the screen display area 110A and 110D through an opening (not illustrated) formed in a portion of the display 101.

According to an embodiment, the second camera module 112 may include a plurality of camera modules (e.g., dual cameras or triple cameras). However, the second camera module 112 is not limited to necessarily including a plurality of camera modules, and may include one camera module.

The first camera module 105 and the second camera module 112 may include one or more lenses, an image sensor, and/or an image signal processor. The flash 113 may include, for example, a light emitting diode or a xenon lamp. According to an embodiment, at least two lenses (an infrared camera, a wide-angle lens, and a telephoto lens) and image sensors may be disposed on one side surface of the electronic device 100.

According to an embodiment, the key input device 117 may be disposed on the side surface 110C (e.g., the first areas 110D and/or the second areas 110E) of the housing 110. According to an embodiment, the electronic device 100 may not include some or an entire portion of the key input device 117 mentioned above, and the key input device 117, which is not included, may be implemented in different forms, such as a soft key, on the display 101. In an embodiment, the key input device may include a sensor module (not illustrated) forming the sensing area (not illustrated) included in the screen display areas 110A and 110D.

According to an embodiment, the connector hole 108 may receive a connector. According to an embodiment, the connector hole 108 may be disposed on the side surface 110C of the housing 110. According to an embodiment, the electronic device 100 may include a first connector hole 108 to receive a connector (e.g., a USB connector) to transmit and/or receive power and/or data together with an external electronic device, and a second connector hole (not illustrated) to receive a connector (e.g., an earphone jack) which transmits/receives an audio signal.

According to an embodiment, the electronic device 100 may include a light emitting device (not illustrated). For example, the light emitting device may be disposed on the first surface 110A of the housing 110. The light emitting device may provide state information of the electronic device 100 in the form of light. According to an embodiment, the light emitting device may provide a light source interworking with the operation of the first camera module 105. For example, the light emitting device may include a light emitting device (LED), an infrared light emitting device (IR LED), and/or a xenon lamp.

Figure 3:
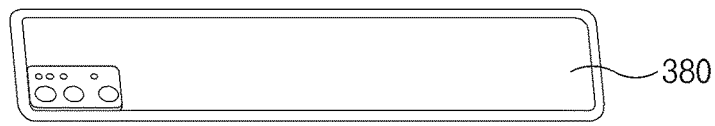
FIG. 3 is an exploded perspective view of an electronic device, according to an embodiment.
Figure 3:
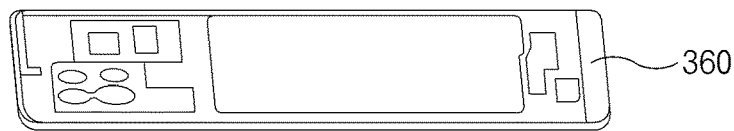
Figure 3:
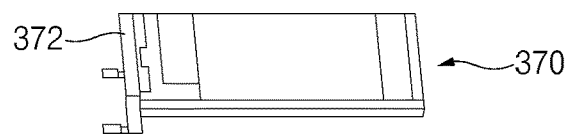
Figure 3:
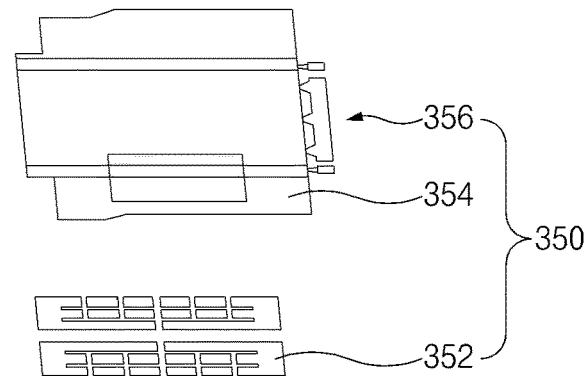
Figure 3:
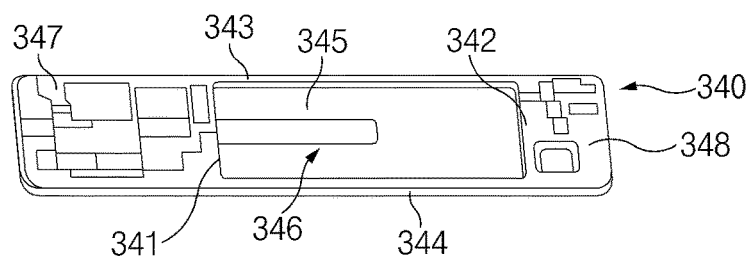
Figure 3:
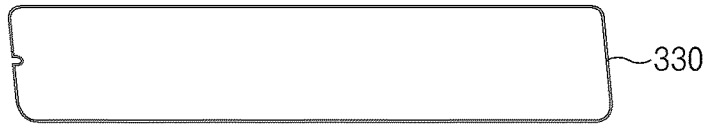
Figure 3:

FIG. 3 is an exploded perspective view illustrating an electronic device, according to an embodiment.

Referring to FIG. 3, an electronic device 300 may include a front plate 320 (e.g., the front surface 110A and the first area 110D of FIG. 1), a display 330 (e.g., the display 101 of FIG. 1), a first support member 340 (e.g., a bracket), a battery 370, a second support member 360 (e.g., a rear case), and a rear plate 380 (e.g., the rear surface 110B and the second area 110E of FIG. 1).

According to an embodiment, the electronic device 300 may omit at least one (e.g., the second support member 360) of the components shown or may additionally include another component not shown. At least one of components of the electronic device 300 may be identical to or similar to at least one of components of the electronic device 300 of FIG. 1 and FIG. 2, and the duplicated description will be omitted below.

According to an embodiment, at least some of the front plate 320, the rear plate 380, or the first and second support members 340 and 360 may form a housing (e.g., the housing 110 of FIGS. 1 and 2).

According to an embodiment, the first support member 340 may include a frame structure 348 forming a surface (e.g., a part of the side surface 110C of FIG. 1) of the electronic device 300, and a plate structure 347 extending from the frame structure 348 toward the inside of the electronic device 300.

The plate structure 347 may be positioned inside the electronic device 300, and may be connected to the frame structure 348, or be integrally formed with the frame structure 348. The plate structure 347 may be made of, for example, metal material and/or non-metal material (e.g., a polymer). The plate structure 347 may have one surface coupled to the display 330 and an opposite surface coupled to a printed circuit board. A processor, a memory, and/or an interface may be mounted on the printed circuit board. The processor may include, for example, one or more of a central processing unit, an application processor, a graphic processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, a secure digital (SD) card interface, and/or an audio interface. The interface may electrically or mechanically connect, for example, the electronic device 300 to an external electronic device, and may include a USB connector, an SD card/multimedia card (MMC) connector, or an audio connector.

The battery 370 may supply power to at least one of the components of the electronic device 300. For example, the battery 370 may include a primary battery, which is not rechargeable, a secondary battery which is rechargeable, or a fuel cell. According to an embodiment, the battery 370 may be integrally disposed inside the electronic device 300, and may be detachably disposed with the electronic device 300, so as to allow the battery 370 to be replaced with new one. According to an embodiment, at least a portion of the battery 370 may be disposed on substantially the same plane as the printed circuit board. The battery 370 may be disposed on a seating surface 345 which is a portion of the surface of the plate structure 347 providing a battery receiving area 346.

The battery receiving area 346 may be defined by the seating surface 345 of the plate structure 347, and first to fourth partitions 341, 342, 343, and 344 extending to a specific height toward the rear plate 380 from the seating surface 345. The first partition 341 may extend in a first direction. The second partition 342 may have the same length as that of the first partition 341 and may be disposed in parallel with the first partition 341. The third partition 343 may extend in a second direction perpendicular to the first direction, between the first partition 341 and the second partition 342. The fourth partition 344 may be disposed in parallel to the third partition 343 with the same length as that of the third partition 343, between the first and second partition 341 and 342. The first partition 341 and the second partition 342 may have the same length as those of the third partition 343 and the fourth partition 344, or different lengths from those of the third partition 343 and the fourth partition 344, depending on the shape of the battery 370.

The battery 370 may be surrounded by a rework member 350 detachably provided. For example, the rework member 350 including a first rework member 354 and a second rework member 356 may be disposed to surround at least four sides of the battery 370. The battery 370 surrounded by the rework member 350 may be attached to and fixed to the seating surface 345 of the battery 370 via the adhesive member 352.

According to certain embodiments, the battery 370 having a protective cover 372 attached to the battery 370 may be positioned in the battery receiving area 346.

Figure 4A:
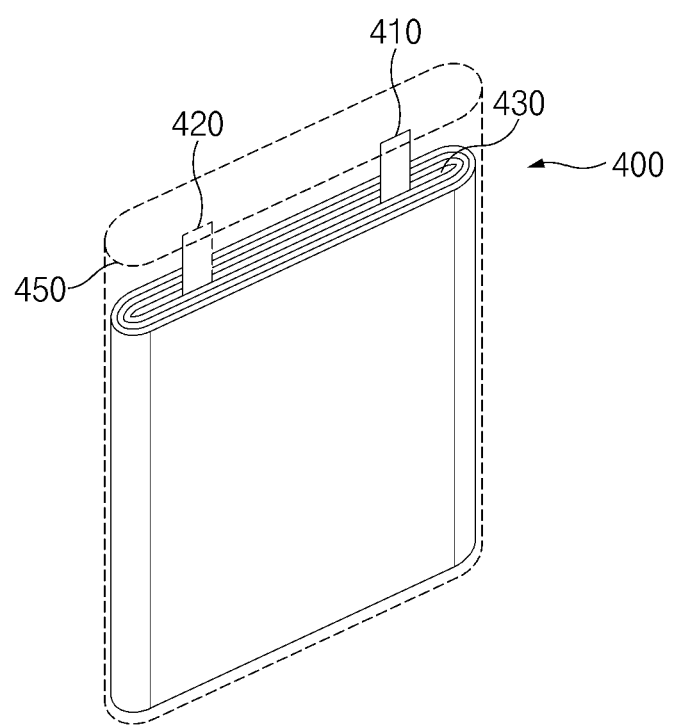
FIGS. 4A and 4B are views illustrating a battery in detail, according to an embodiment.
Figure 4B:
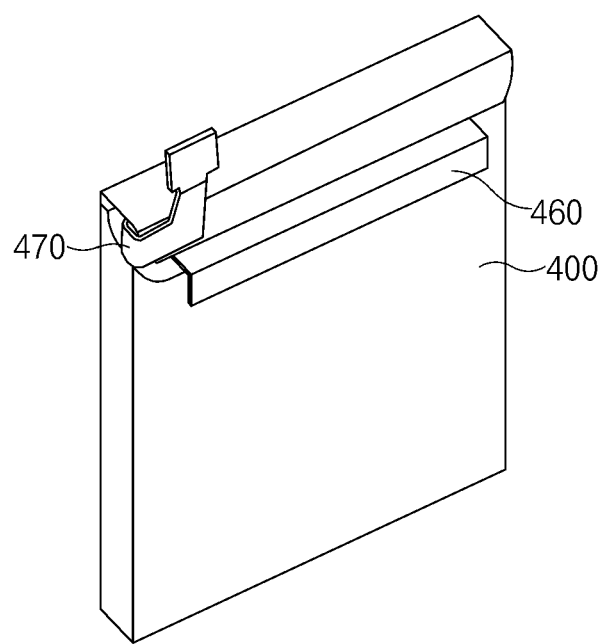

FIG. 4A is a perspective view illustrating a battery before a protective cover is attached to the battery, according to an embodiment, and FIG. 4B is a perspective view illustrating a battery having a protective cover attached to the battery, according to an embodiment.

Referring to FIGS. 4A and 4B, the battery 400 may store electrical energy by taking advantage of chemical reactions. The battery 400 may include a positive electrode tab 410, a negative electrode tab 420, an electrode assembly 430, and a pouch (or a battery pouch) 450.

An electrode assembly 430 may be a structure in which a cathode plate, an anode plate, and a separator are overlapped with each other and are wound. For example, the electrode assembly 430 may be provided in the form of a jelly roll. A cathode tab 420 may be attached to one end of the cathode plate such that the cathode tab 420 is exposed to the outside, and an anode tab 410 may be attached to one end of the anode plate, such that the anode tab 410 is exposed to the outside. According to another embodiment, the electrode assembly 430a may be formed in a stack-type structure in which the cathode plate, and the anode plate are alternately stacked on each other, and the separator is disposed between the cathode plate and the anode plate. The cathode plate may be made as a single piece to be bent at a specific distance widthwise. The anode plate may be formed in the same shape as that of the cathode plate.

The pouch 450 may provide an inner space for receiving the electrode assembly 430. The electrode assembly 430 may be in close contact with the inner surface of the pouch 450 so that it is fixed inside the pouch 450 without room to move inside the pouch 450.

The anode tab 410 and the cathode tab 420 of the battery 400 are electrically connected to an external input/output terminal 470 formed on the protection circuit board of the battery. The external input/output terminal 470 may protrude out of an opening formed in the protective cover 460 to cover a first side surface of the battery 400. The protective cover 460 may protect the battery 400 from external impacts applied to, for example, an edge of the battery 400.

Figure 5:
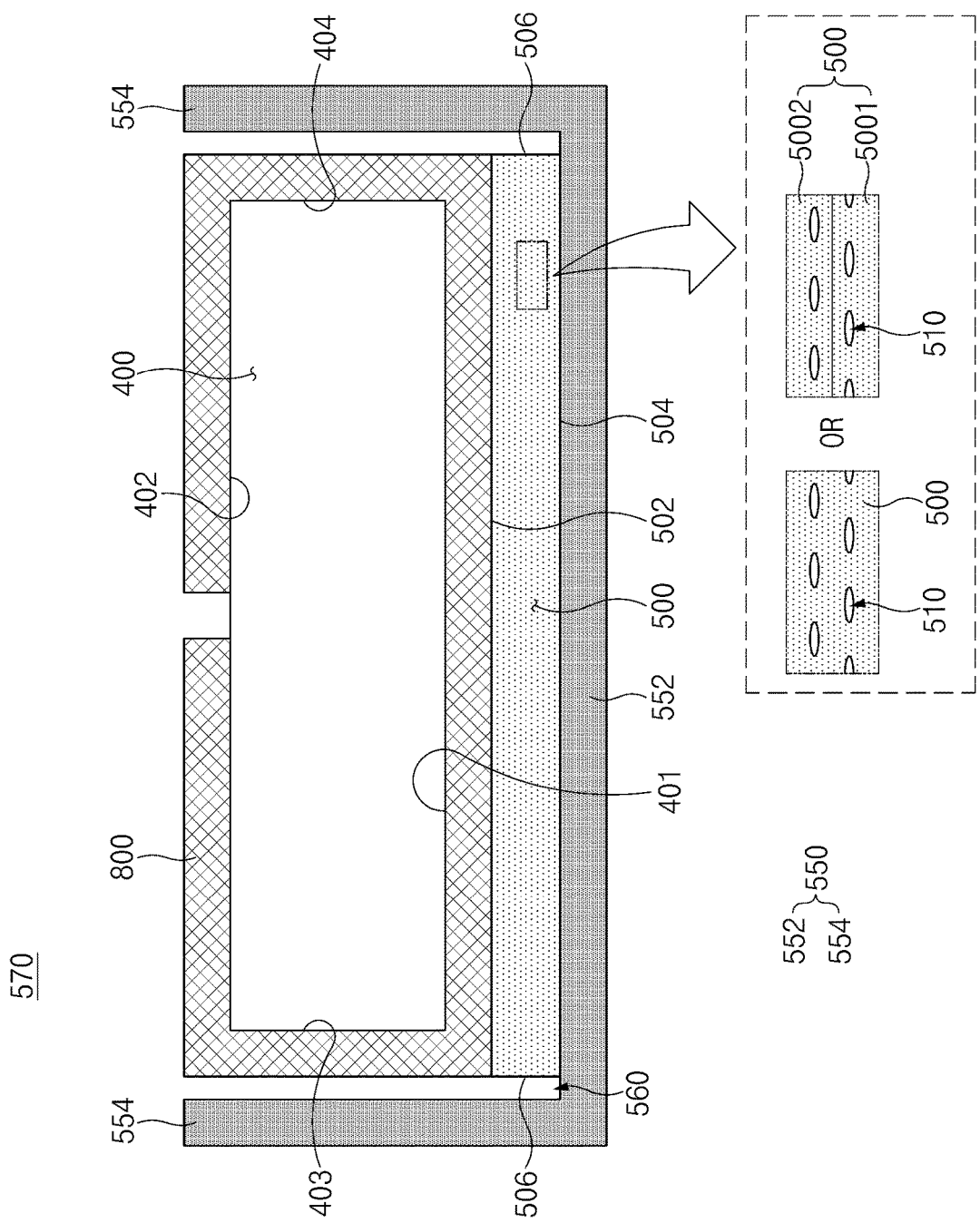
FIG. 5 is a cross-sectional view illustrating an electronic device, according to an embodiment.
Figure 6A:
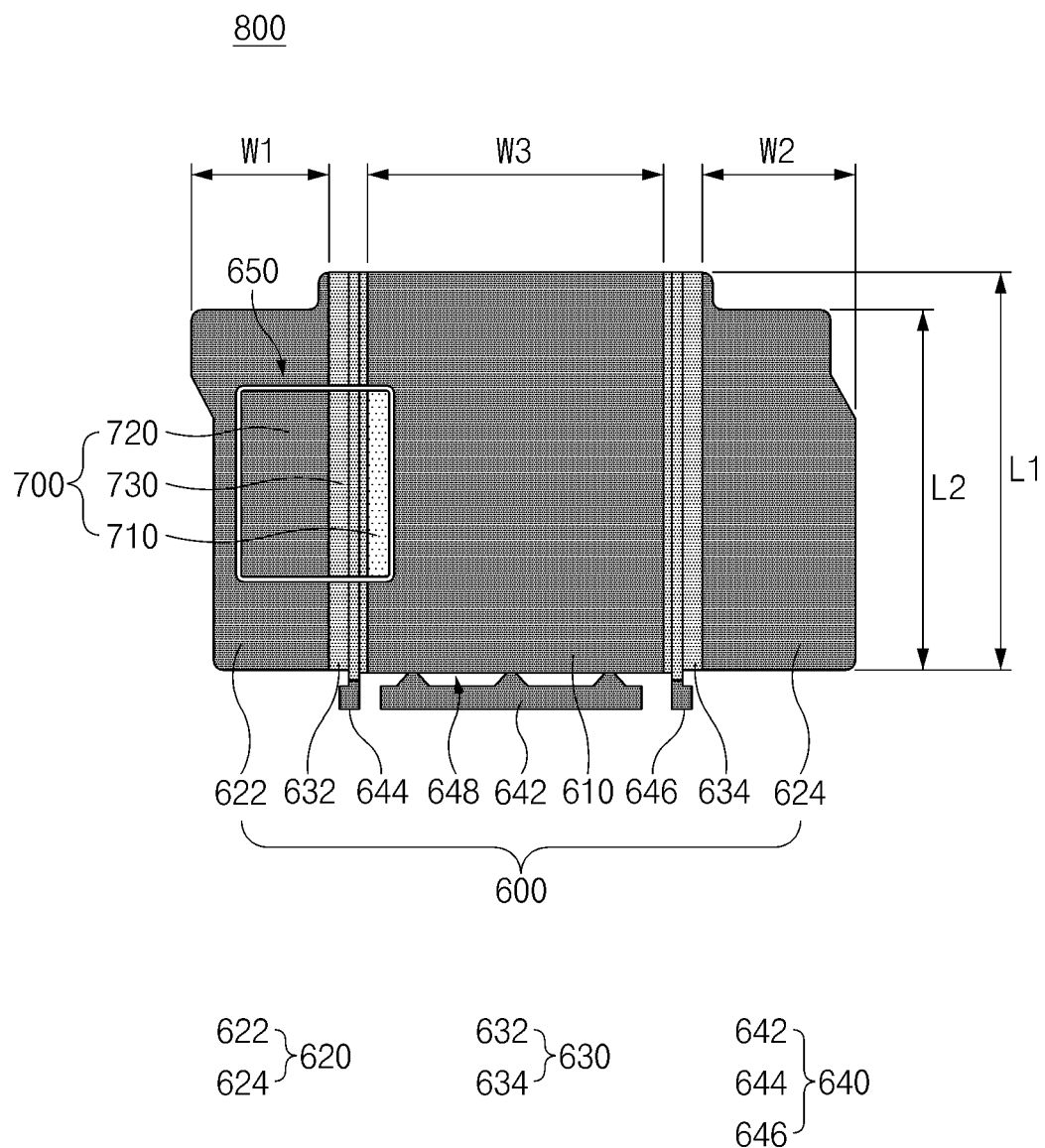
FIG. 6A is a plan view illustrating a rework member, according to an embodiment.
Figure 6B:
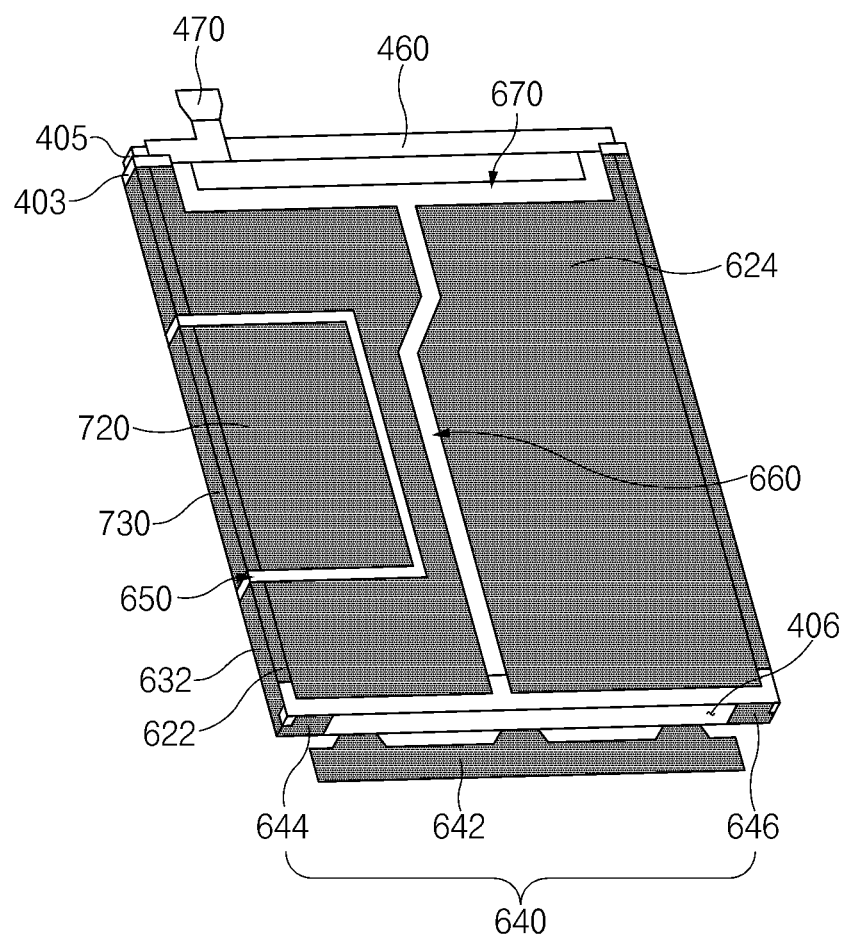
FIG. 6B is a perspective view illustrating a battery to which the rework member is attached, according to an embodiment.
Figure 7A:
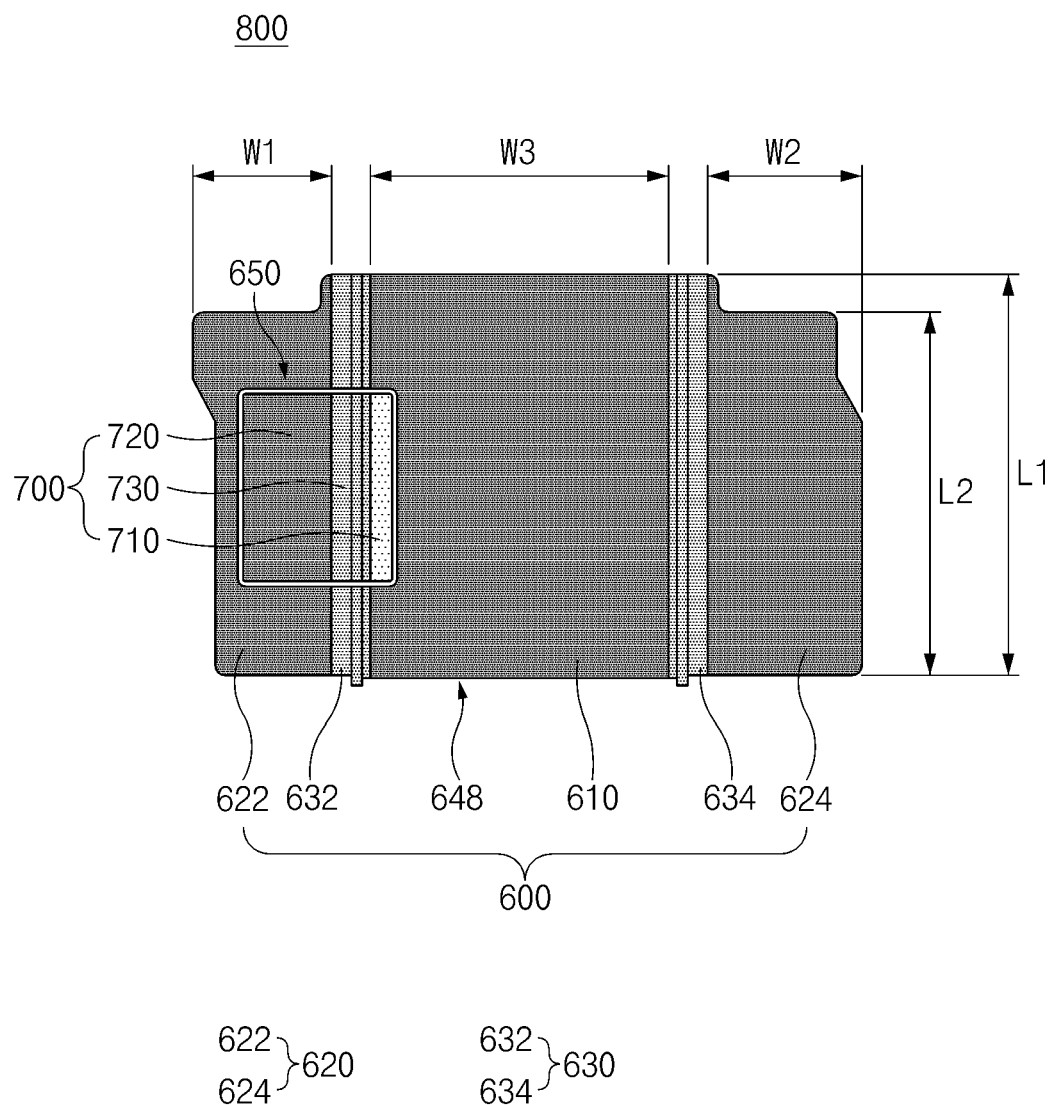
FIG. 7A is a plan view illustrating a rework member, according to another embodiment.
Figure 7B:
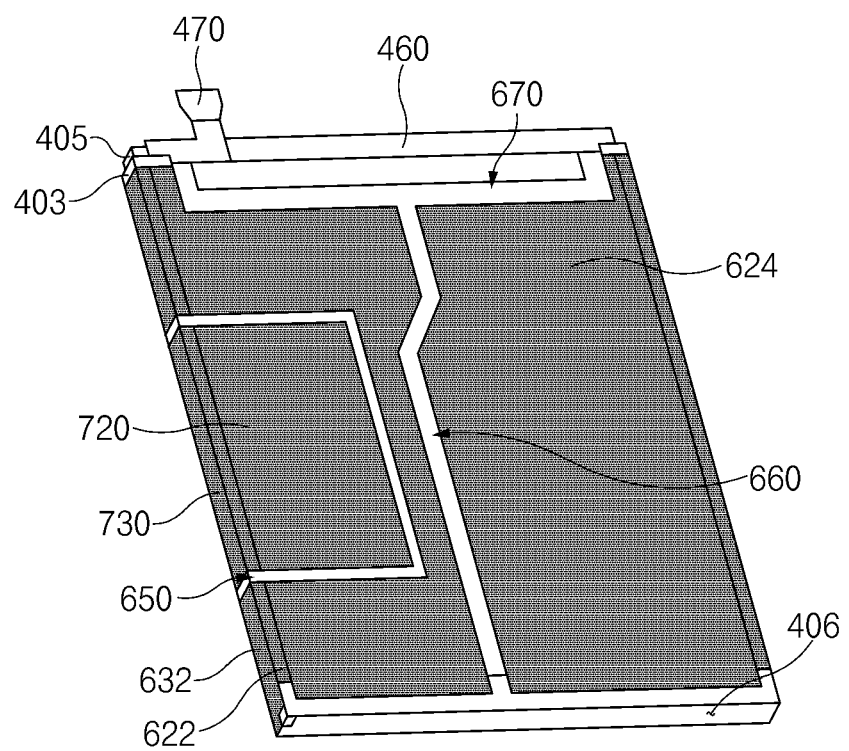
FIG. 7B is a perspective view illustrating a battery to which a rework member is attached, according to another embodiment.

FIG. 5 is a cross-sectional view illustrating a housing of an electronic device having the battery 400 positioned in the electronic device, according to an embodiment, and FIGS. 6A and 6B are views illustrating a rework member and a battery structure having a rework member attached to the battery, according to an embodiment. FIGS. 7A and 7B are views illustrating a rework member and a battery structure having the rework member attached to the battery, according to another embodiment.

Referring to FIGS. 5 to 7B, the electronic device 570 may include a housing 550, a battery 400, an adhesive member 500, and a rework member 800.

The housing 550 may include a seating surface 552 and a plurality of partitions 554 to provide a battery receiving space 560. The seating surface may be provided to face a front plate (e.g., the front plate 320 of FIG. 3), and may be a surface to seat the battery 400 while deploying the adhesive member 500 and the rework member 800. The plurality of partitions 554 may extend from the seating surface 552 toward a rear plate (e.g., the rear plate 380 of FIG. 3). Each of the plurality of partitions 554 may be disposed to face a side surface of the battery 400.

The adhesive member 500 may be interposed between the seating surface 552 of the housing 550 and the battery 400. For example, the adhesive member 500 may be disposed between the seating surface 552 of the housing 550 and the rework member 800 surrounding the battery 400. The adhesive member 500 may be stretchable so as to exhibit excellent flexibility and elasticity, such that the battery 400 is easily separated from the housing 550 and the rework member 800, when the battery 400 needs to be replaced with new one.

The adhesive member 500 may be made with inorganic material, and may be provided in the form of a double-sided tape having double-sided adhesive properties. The adhesive member 500 may have at least a single adhesive layer and may not have a base or substrate. The adhesive member 500 may have a rear surface 502 in contact with the rework member 800, a front surface 504 facing opposite the rear surface 502, and four side surfaces 506 facing the partitions 554 of the housing 550. When the adhesive member 500 includes a single adhesive layer, the adhesive member 500 may have no internal interfaces in the adhesive member 500. When the adhesive member 500 includes multiple adhesive layers 5001 and 5002, the adhesive layers 5001 and 5002 may have an adhesive property, and may form an interface inside the adhesive member 500. The adhesive layers 5001 and 5002 included in the adhesive member 500 may be coupled to each other.

The entire surface of any one side surface 506 of four side surfaces 506 of the adhesive member 500 may have an adhesive property. According to certain embodiments of the disclosure, the adhesive member 500 has no base, so the thickness of the adhesive member 500 is reduced, such that a thin adhesive member is implemented.

The adhesive member 500 may be formed to have a plurality of pores 510. As pores 510 may absorb impact, the adhesive member 500 may have higher impact resistance. For example, the adhesive member 500 having the pores 510 without a base may have higher impact resistance than that of a double-side tape having the same thickness as that of the adhesive member 500 and including a base, because the adhesive member 500 has a wider area that can be occupied by the pores 510.

The rework member 800 may have lower adhesive force lower than that of the adhesive member. The rework member 800 may be provided to surround all surfaces of the battery 400 except for at least one surface. Although an external impact, such as a drop of the electronic device 570, is caused, the battery 400 may have durability against loads which is applied to the battery 400 in a vertical direction and a front-end direction by the rework member 800. For example, when impact occurs in the vertical direction and the front-end direction between the battery 400 and the rework member 800 (when a slip occurs between the battery 400 and the rework member 800), a load may be applied to all areas of the rework member 800 surrounding up to five surfaces of the battery 400. Accordingly, as the coupling force between the rework member 800 and the battery 400 is increased, the rework member 800 may be prevented from separating from the battery 400 or slipping with respect to the battery 400, due to the external impact.

The rework member 800 may include a first rework member 600 (or a first adhesive cover member) detachably attached to the battery 400 and a second rework member 700 (or a second adhesive cover member). The rework member 800 may be separated from the battery 400 and the adhesive member 500, when the battery 400 is separated and replaced.

The first rework member 600 may be disposed between the battery 400 and the adhesive member 500. The first rework member 600 may be attached to at least two surfaces of the battery 400 while surrounding at least four surfaces of the battery 400. The first rework member 600 may have more surfaces surrounding the battery 400 than those of the second rework member 700. The first rework member 600 may be attached to a first surface 401 of the battery 400, which is parallel to the adhesive member 500, a second surface 402 of the battery 400, which faces the first surface 401, and at least one of side surfaces of the battery 400 to connect the first surface 401 and the second surface 402.

According to an embodiment, the battery 400 may include one side surface 403 and an opposite side surface 404 facing each other in one direction, and a top surface 405 and a bottom surface 406 facing each other in a direction different from the one direction. The first rework member 600 may be attached to the first surface 401, the second surface 402, the one side surface 403, the opposite surface 404, and the bottom surface 406 and may not be attached to the top surface 405. The first rework member 600 may include a first rework area 610, a second rework area 620, a third rework area 630, and a fourth rework area 640 (or first to fourth cover areas).

The first rework area 610 may be interposed between the adhesive member 500 and the battery 400. The first rework area 610 may include an inner surface making contact with the first surface 401 of the battery 400 and an outer surface making contact with the adhesive member 500. The first rework area 610 may be disposed to surround three surfaces of the fifth rework area 710 (or the fifth cover area) of the second rework member 700. The first rework area 610 may be attached to the adhesive member 500 and the first surface 401 of the battery 400, together with the fifth rework area 710 of the second rework member 700.

The second rework area 620 may be attached to the second surface 402 of the battery 400, which faces the first surface 401. The second rework area 620 may include an inner surface making contacting with the second surface 402 of the battery 400, and an outer surface exposed to the outside to face a rear plate (e.g., the rear plate 380 of FIG. 3). The second rework area 620 may include a first rear surface area 622 and a second rear surface area 624.

The first rear surface area 622 may be disposed to surround at least a portion of the edge area of the sixth rework area 720 (or the sixth cover area) of the second rework member 700. The first rear surface area 622 may make contact with a partial area of the second surface 402 of the battery 400. The second rear surface area 624 may make contact with at least a portion of the remaining area of the second surface 402 of the battery 400. The second rear surface area 624 may be disposed to be spaced apart from the first rear surface area 622 while interposing a second separation area 660 between the second rear surface area 624 and the first rear surface area 622, when the battery is attached.

The sum of the maximum width 'W1' of the first rear surface area 622 and the maximum width 'W2' of the second rear surface area 624 may be less than or equal to the width 'W3' of the first rework area 610 (W1+W2≤W3).

The length 'L2' of a portion of the second rear surface area 624 may be shorter than or equal to the maximum length 'L1' of the first rework area 610. The lengths 'L1' and 'L2' of the first and second rework areas 610 and 620 may be formed in parallel to the lengthwise direction of the third rework area 630. A partial area 670 of the second surface 402 of the battery 400, in which the input/output terminal 470 of the battery 400 and the protective cover 460 are disposed, and the top surface 405 of the battery 400 may be exposed to the outside by the second rework area 620 shorter than the first rework area 610. In the state in which the input/output terminal 470 and the protective cover 460 of the battery 400 are exposed, the first rework member 600 may be attached to the battery 400.

According to another embodiment, when the input/output terminal 470 and the protective cover 460 are disposed in the partial area of the battery 400, which corresponds to the first rework area 610, the length 'L1' of the first rework area 610 may be formed to be shorter than or equal to the length 'L2' of the second rework area 620.

The third rework area 630 may face the one side surface 403 and the opposite side surface 404 of the battery 400 facing the side surfaces of the housing 550. The third rework area 630 may include an inner surface making contact with the one side surface 403 and the opposite side surface 404 of the battery 400, and an outer surface exposed to the outside to face the side surface of the housing 550. The third rework area 630 may include a first side area 632 making contact with the one side surface 403 of the battery 400, and a second side area 634 making contact with the opposite side surface 404 of the battery 400.

The first side area 632 may be interposed between the first rework area 610 and the first rear surface area 622. When the first rework member 600 is attached to the battery 400, the first side area 632 may be bent from the first rework area 610 and the first rear surface area 622. The first side area 632 may be disposed to be spaced apart from the seventh rework area 730 (or the seventh cover area) of the second rework member 700, while the first separation area 650 interposed between the first side area 632 and the seventh rework area 730. The one side surface 403 of the battery 400 may make contact with the first rework member 600 and the second rework member 700 by contacting the first side area 632 of the first rework member 600 and the seventh rework area 730 of the second rework member 700.

The second side area 634 may be interposed between the first rework area 610 and the first rear surface area 624. When the first rework member 600 is attached to the battery 400, the second side area 634 may be bent from the first rework area 610 and the first rear surface area 624. The second side area 634 may make contact with the opposite surface 404 of the battery 400, which is parallel to the one side surface 403 of the battery 400. The opposite side surface 404 of the battery 400 may make contact with the first rework member 600 by contacting the second side area 634.

The fourth rework area 640 may be attached to a bottom surface 406 of the battery 400, which faces the side surface of the housing 550. The fourth rework area 640 may include an inner surface making contact with the bottom surface 406 of the battery 400, and an outer surface exposed to the outside to face the side surface of the housing 550. The fourth rework area 640 may include a third side area 642, a fourth side area 644, and a fifth side area 646 making contact with the bottom surface 406 of the battery 400.

The third side area 642 having an area corresponding to the bottom surface of the battery 400, may include at least one hole 648. The shape of the hole 648 is not limited to the shape illustrated in FIG. 6, but may be formed in various shapes. For example, the hole 648 may be formed in a polygonal shape, a circular shape, and an oval shape. The at least one hole 648 may be used for a path allowing an electrolyte to be introduced to the jelly roll structure of the battery, when the jelly roll structure is sealed in the pouch. When the first rework member 600 is attached to the battery 400, the third side area 642 may be bent from the first rework area 610 and attached to the bottom surface of the battery 400.

The fourth side area 644 may extend from the first side area 632. When the first rework member 600 is attached to the battery 400, the fourth side area 644 may be bent from the first side area 632 and attached to the bottom surface of the battery 400.

The fifth side area 646 may extend from the second side area 634. When the first rework member 600 is attached to the battery 400, the fifth side area 646 may be bent from the second side area 634 and attached to the bottom surface of the battery 400.

The bottom surface of the battery 400 may be protected by the fourth rework area 640 including the third to fifth side areas 642, 644, and 646. Accordingly, a separate protective tape may be omitted. In addition, the rework member 800 includes the fourth rework area 640. Accordingly, the rework member 800 may be attached to the battery 400 to surround the battery 400 to the bottom surface of the battery 400. In this case, when external impact, such as drop of the electronic device 570, is caused, an attractive force may be generated between the battery 400 and all areas of the rework member 800 covering the bottom surface 406 of the battery 400. Accordingly, the coupling force between the rework member 800 and the battery 400 is increased. And therefore, durability against slip load applied in the vertical direction may be enhanced.

According to another embodiment, the first rework member 600 illustrated in FIGS. 7A and 7B may include the first to third rework areas 610, 620, and 630, without the fourth rework area 640 illustrated in FIGS. 6A and 6B. The first rework member 600 may be attached to the battery 400 to surround four surfaces of the battery 400 without surrounding the bottom surface of the battery 400. As described above, the first rework member 600 having no the fourth rework area 640 is simplified in structure, such that the first rework member 600 can be assembled with the battery 400 with an automated process.

The second rework member 700 may be disposed to be spaced apart from the first rework member 600 by having the first separation area 650 interposed between the second rework member 700 and the first rework member 600. The second rework member 700 may be completely separated from the first rework member 600, meaning there is no area that connects the first rework member 600 with the second rework member 700. Each of the first and second rework members 600 and 700 may be separated from the battery 400, without using cutting equipment, such as a knife for separating the first and second rework members 600 and 700. As described above, conventionally the use of the knife is likely to cause accidental damage to the battery 400, but in an embodiment, since the cutting equipment is not used, defects or accidents may be prevented from being caused to the battery 400.

The second rework member 700 may be formed to have an area smaller than that of the first rework member 600, and may be disposed to be surrounded by the first rework member 600. The second rework member 700 may be formed to have the thickness equal to that of the first rework member 600. A step may not occur between the first rework member 600 and the second rework member 700 when they are disposed on the battery 400. There is a smooth transition between the first rework member 600 and the second rework member 700 when they are disposed on the battery 400. The second rework member 700 may include a fifth rework area 710, a sixth rework area 720, and a seventh rework area 730.

The fifth rework area 710 may be disposed on the same plane as that of the first rework area 610 of the first rework member 700. The fifth rework area 710 may be attached onto the first surface 401 of the battery 400 together with the first rework area 610 of the first rework member 700. The fifth rework area 710 may be disposed to be spaced apart from the first rework area 610 of the first rework member 700 by interposing the first separation area 650 between the fifth rework area 710 and the first rework area 610.

The sixth rework area 720 may be disposed on the same plane as that of the first rear surface area 622 of the first rework member 600. The sixth rework area 720 may be attached onto the second surface of the battery 400, together with the first rear surface area 622 of the first rework member 700. The sixth rework area 720 may be disposed to be spaced apart from the first rear surface area 622 of the first rework member 700 by interposing the first separation area 650 between the sixth rework area 720 and the first rear surface area 622 of the first rework member 700. The sixth rework area 720 may implement a handle that allows a worker to grip the second rework member 700, when the battery 400 needs to be replaced with new one.

The seventh rework area 730 may be disposed on the same plane as that of the first side area 632 of the first rework member 600. The seventh rework area 730 may be attached onto one side surface of the battery 400, together with the first side area 632 of the first rework member 600. The seventh rework area 730 may be disposed to be spaced apart from the first side area 632 of the first rework member 600 by interposing the first separation area 650 between the seventh rework area 720 and the first side area 632 of the first rework member 600.

According to certain embodiments, the first and second rework members 600 and 700 may have varied adhesive force depending on the contact with the battery 400.

Figure 8:
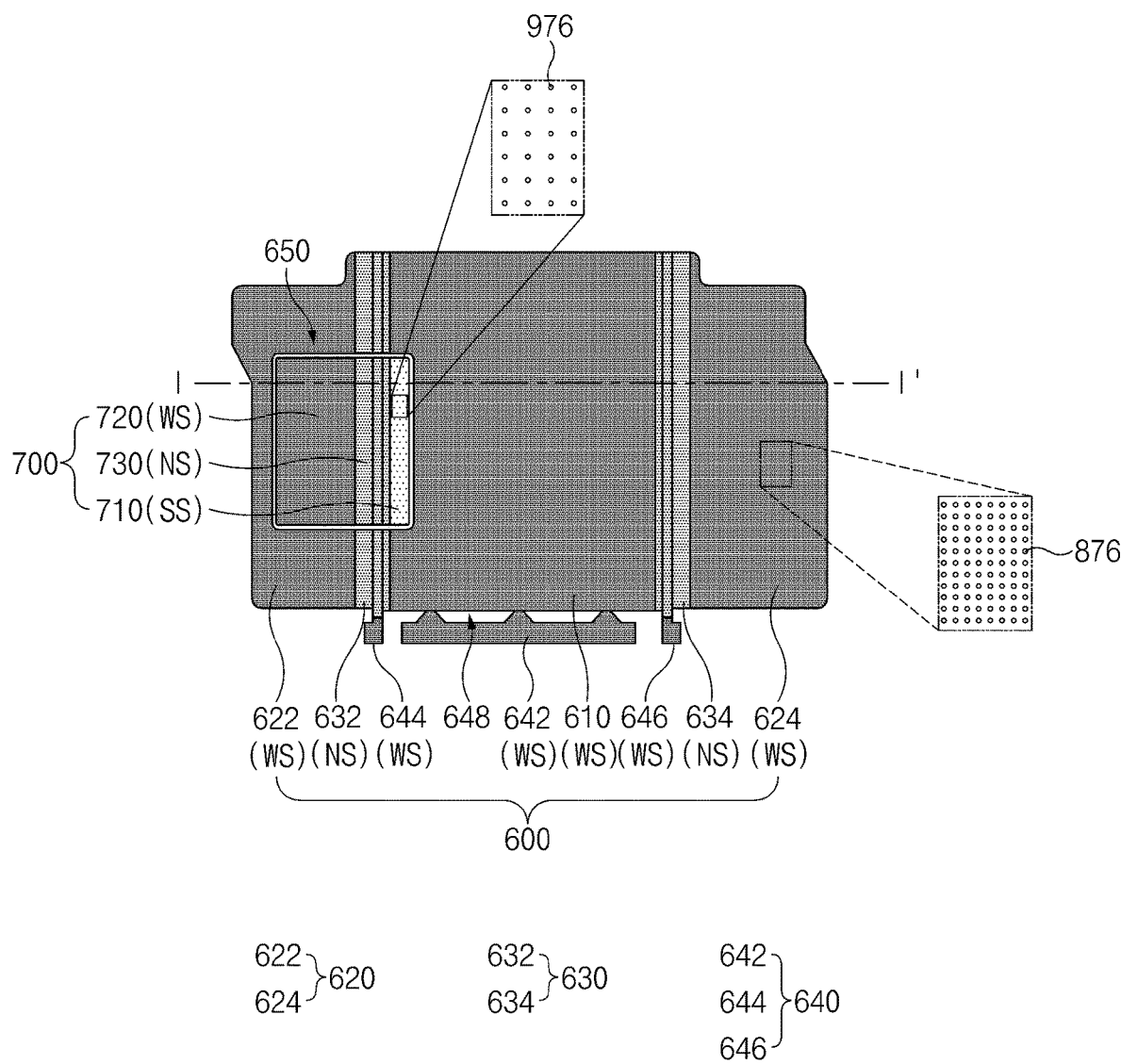
FIG. 8 is a plan view illustrating a rework member in detail, according to an embodiment.
Figure 9:
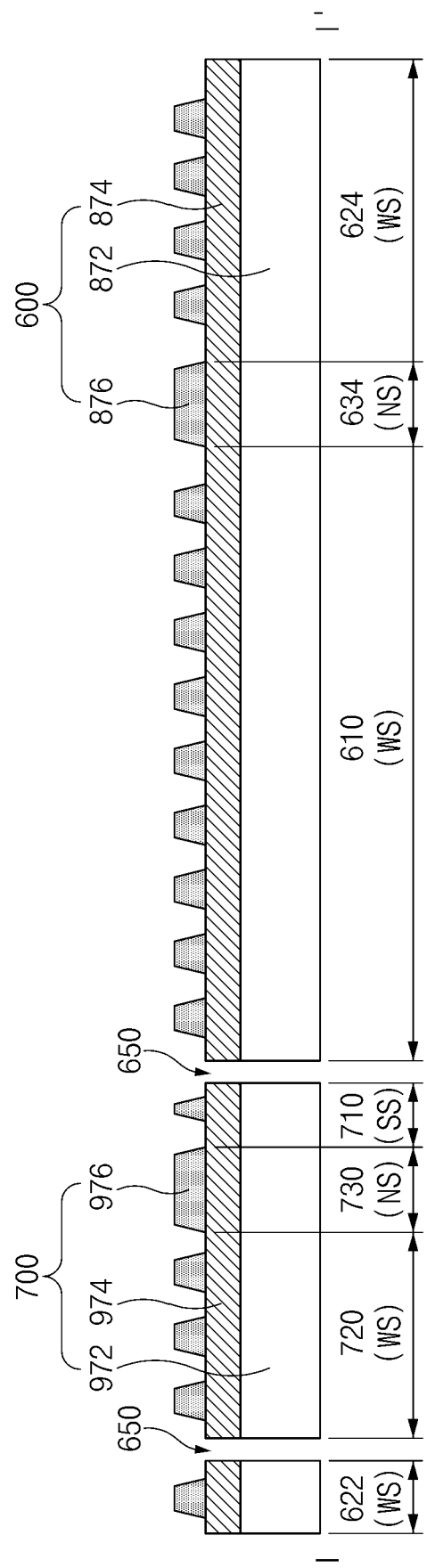
FIG. 9 is a cross-sectional view illustrating a rework member taken along line I-I' of FIG. 8.

FIG. 8 is a plan view illustrating a first rework member and a second rework member included in an electronic device, according to an embodiment, and FIG. 9 is a cross-sectional view illustrating the first and second rework members taken along line I-I' of FIG. 8.

Referring to FIGS. 8 and 9, in the rework member 800, a contact surface with the battery (e.g., the battery 400 of FIG. 5) may be classified into a strong adhesive surface 'SS', a weak adhesive surface 'WS', and a non-adhesive surface 'NS' depending on the contact positions of the battery.

The strong adhesive surface 'SS' may be an inner surface of the fifth rework area 710 of the second rework member 700. The strong adhesive surface 'SS' of the second rework member 700 may have first adhesive force to sufficiently withstand force applied by a worker, when the battery is separated. For example, the strong steel adhesive surface 'SS' may have first adhesive force of more than 100 gram-force (gf). The strong steel adhesive surface 'SS' may have first adhesive force 'n' times (in this case, 'n' is an integer greater than 1) greater than second adhesive force of the weak adhesive surface 'WS'. The fifth rework area 710 of the second rework member 700 having the first adhesive force may make contact with a portion of the first surface of the battery 400. The strong adhesive surface 'SS' may have an area narrower than that of the weak adhesive surface 'WS' and the non-adhesive surface 'NS' of the second rework member 700.

Weak adhesive surfaces 'WS' may be inner surfaces of the first and second and fourth rework area 610, 620, and 640 of the first rework member 600 and the sixth rework area 720 of the second rework member 700. The weak adhesive surface 'WS' may have the second adhesive force weaker than the first adhesive force. For example, the weak adhesive surface 'SS' may have the second adhesive force of 100 gf or less. The first, second, and fourth rework areas 610, 620, and 640 of the first rework member 600, and the sixth rework area 720 of the second rework member 700, which have the second adhesive force, may make contact with the remaining area of the second surface of the battery 400, the first surface of the battery 400, and the bottom surface of the battery 400. The adhesive force of the weak adhesive surface 'WS' may be weaker than the adhesive force of the adhesive member 500.

Non-adhesive surfaces 'WS' may be inner surfaces of the first and second side areas 632 and 634 of the first rework member 600, and the seventh rework area 730 of the second rework member 700. The non-adhesive surface 'WS' may have no adhesive force or may have third adhesive force lower than the second adhesive force. The third and seventh rework areas 630 and 730 having no adhesive force or the third adhesive force may make contact with one side surface of the battery 400 and opposite side surfaces 403 and 404 of the battery 400.

According to an embodiment, the inner surfaces of the third and seventh rework areas 630 and 730 may be implemented as a non-adhesive surface having no adhesive force. Accordingly, when the rework member 800 is separated, the load is not applied to the side surface of the battery 400 at all, thereby preventing furrows from being formed on a surface of the pouch (e.g., the pouch 450 of FIG. 4A) of the battery 400 and preventing an internal electrolyte from leaking out. In addition, even if adhesive force is absent in a local area corresponding to the side surface of the battery 400 of the rework member 800, the rework member 800 still surrounds five surfaces of the battery 400, thereby preventing the rework member 800 from slipping or preventing adhesive force of the rework member 800 from being lowered.

According to an embodiment, non-adhesive layers, which are arranged on adhesive layers included in the first rework member and the second rework member, are formed to be different from each other in size and spacing to exhibit different adhesive forces.

More particularly, the first rework member 600 may include a first adhesive layer 874 disposed on a first base substrate 872, and a first non-adhesive layer 876 disposed on the first adhesive layer 874. The second rework member 700 may include a second adhesive layer 974 disposed on a second base substrate 972 and a second non-adhesive layer 976 disposed on the second adhesive layer 974.

The first and second base substrates 872 and 972 may be formed of the same material and may have the same thickness. The first and second adhesive layers 874 and 974 are formed of the same material. Accordingly, the first and second adhesive layers 874 and 974 may have the same adhesive force. The first and second non-adhesive layers 876 and 976 may be formed of the same material and may have the same thickness. The adhesive force of each of the first and second rework members 600 and 700 may be adjusted by the sizes of the first and second non-adhesive layers 876 and 976, and the spacing between the first and second non-adhesive layers 876 and 976. According to an embodiment, the first and second non-adhesive layers 876 and 976 may be made of an acrylic material or a photocurable material, and may be formed through a printing process.

The first separation area 650 is interposed between the first and second rework members 600 and 700. Accordingly, each of the first base substrate 872 and the first adhesive layer 874 of the first rework member 600 may be disposed to be spaced apart from each of the base substrate 972 and the adhesive layer 974 of the second rework member 700.

The second non-adhesive layer 976 may not be formed in the fifth rework area 710 of the second rework member 700 corresponding to the strong adhesive surface 'SS'. According to another embodiment, the size of the second non-adhesive layer 976 corresponding to the strong adhesive surface 'SS' may be smaller than the size of the first non-adhesive layer 876 disposed on the weak adhesive surface 'WS'. According to another embodiment, the spacing between the second non-adhesive layers 976 corresponding to the strong adhesive surface 'SS' may be greater than the spacing of the first non-adhesive layers 876 disposed on the weak adhesive surface 'WS'. For example, the first non-adhesive layers 876 disposed on the weak adhesive surface 'WS' may be spaced apart from each other by a distance ranging from 3 µm to 5 µm. According to another embodiment, the size of the second non-adhesive layer 976 corresponding to the strong adhesive surface 'SS' may be smaller than the size of the first non-adhesive layer 876 disposed on the weak adhesive surface 'WS', and the spacing between the second non-adhesive layers 976 corresponding to the strong adhesive surface 'SS' may be wider than the spacing between the first non-adhesive layers 876 disposed on the weak adhesive surface 'WS'.

Sizes of the first and second non-adhesive layers 876 and 976 corresponding to the non-adhesive surface 'NS' may be larger than sizes of the first and second non-adhesive layers 876 and 976 corresponding to the weak adhesive surface 'WS'. For example, the first and second non-adhesive layers 876 and 976 corresponding to the non-adhesive surface 'NS' may have the same size as the sizes of the first to third side areas 632, 634, and 730.

According to certain embodiments, each of the first and second adhesive layers 874 and 974 may have different adhesive forces that vary depending on a contact position with the battery 400, and thus the first and second non-adhesive layers 876 and 976 may be omitted in such embodiments.

According to certain embodiments, when maintenance of the battery 400 is required, the worker may separate and dismantle the battery 400 from the adhesive member 500 by using the second rework member 700 as a handle. For example, the strong adhesive surface 'SS' of the second rework member may have the first adhesive force to sufficiently withstand the force applied by the worker, when the battery 400 is dismantled and separated. Accordingly, the second rework member 700 may be attached to the battery 400, until the battery 400 is separated from the adhesive member 500.

Figure 10A:
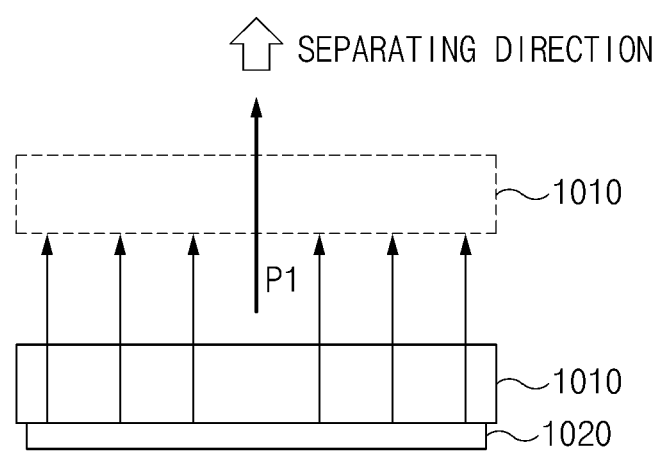
FIG. 10A is a view illustrating a direction of separating a conventional battery.
Figure 10B:
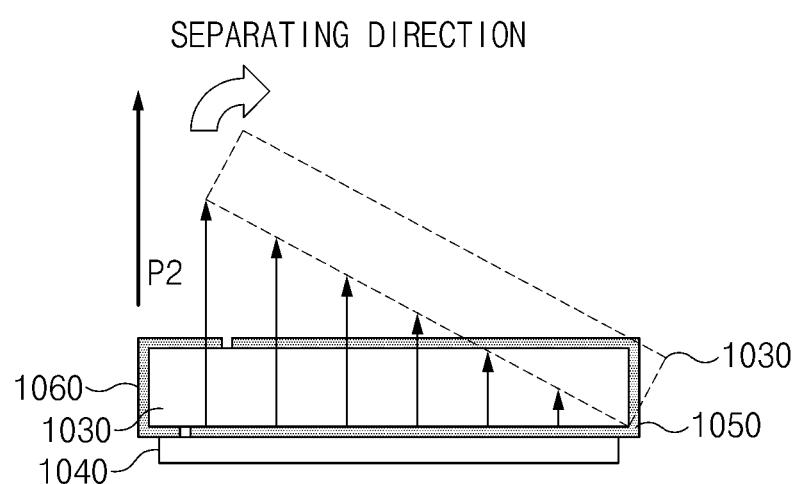
FIG. 10B is a view illustrating a direction of separating a battery, according to an embodiment.

FIG. 10A is a view illustrating the direction of dismantling a conventional battery. FIG. 10B is a view illustrating the direction of dismantling a battery, according to an embodiment.

Referring to FIG. 10A, conventionally in the art, the battery 1010 may be separated from the adhesive tape 1020 using suction force 'P1' generated from a separating jig. The separating jig may separate the battery 1010 from the adhesive tape 1020 by pulling the battery 1010 in a direction perpendicular to one surface of the battery 1010 making contact with the separating jig. In this case, the stress applied to the adhesive tape 1020 may be uniformly distributed throughout the whole area of the adhesive tape 1020.

Referring to FIG. 10B, according to an embodiment, a rework member including the first and second rework members 1050 and 1060 may be attached to the battery 1030. According to an embodiment, the battery 1030 may be separated from the adhesive member 1040 by force 'P2' of a worker using the second rework member 1060 as a handle. The second rework member 1060 is disposed adjacent to one side surface of the battery 1030. Accordingly, the worker may pull the adhesive member 1040 from one side toward of the opposite side of the adhesive member 1040 using the handle implemented by the second rework member 1040. In this case, the stress applied to the adhesive member 1040 may be concentrated onto a separation starting point of one side surface of the battery 1030, which is overlapped with the second rework member 1060.

When the suction force 'P1' of the conventional separating jig, and the force P2 of the worker according to an embodiment disclosed herein are identical, greater stress may be concentrated onto the separation starting point of the battery 1030 in the disclosed embodiment. Accordingly, the intensity of force 'P2' to be applied when the battery 1030 is dismantled may be reduced, when compared to that of the conventional example.

According to an embodiment, to apply the separating direction, the second rework member 1060 implementing the handle may be attached to the first surface of the battery 1030 facing the second rework member 1060. Accordingly, the second rework member 1060 may sufficiently withstand the force applied to the second rework member 1060 by the worker, when the battery 1030 is dismantled.

Figure 11A:
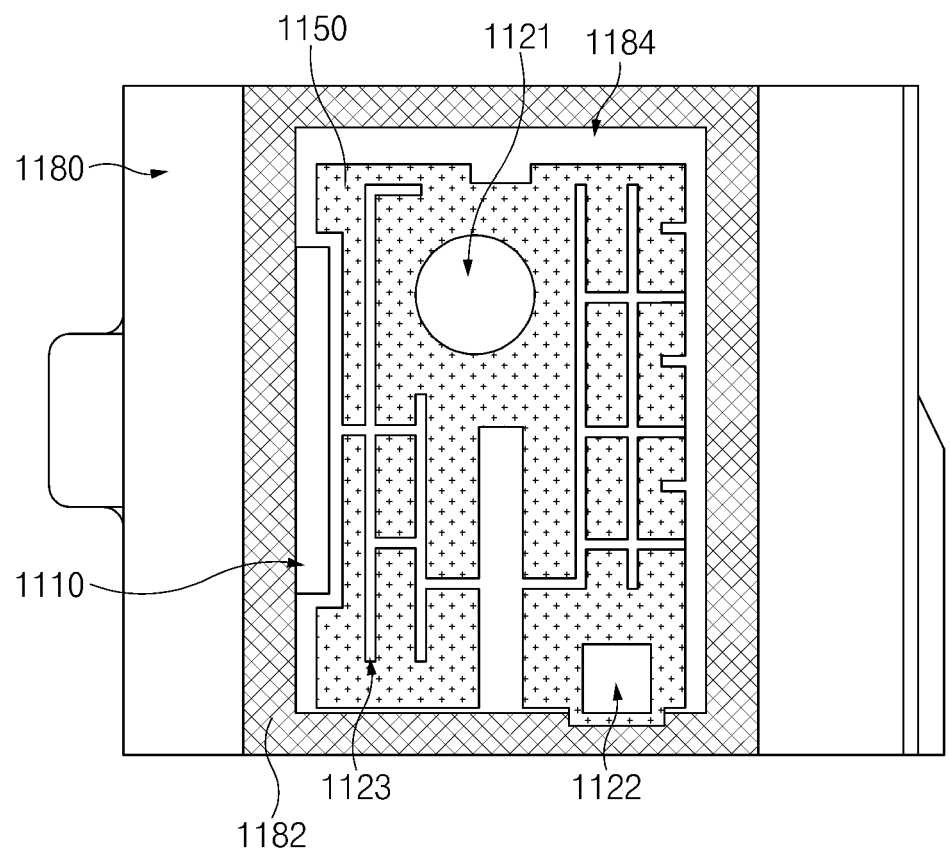
FIG. 11A is a plan view illustrating an adhesive member attached to a housing, according to an embodiment.
Figure 11B:
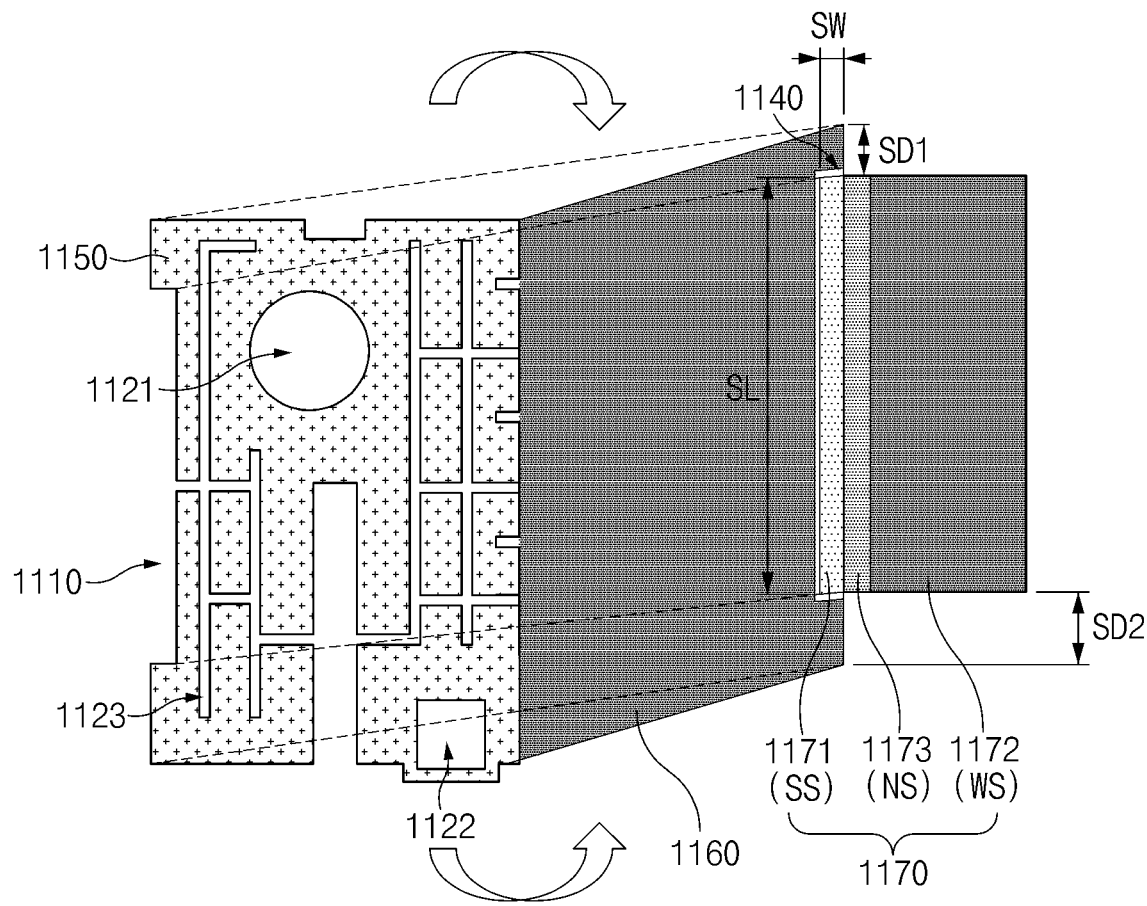
FIG. 11B is a view illustrating an adhesive member and a rework member, according to an embodiment.

FIG. 11A is a plan view illustrating an adhesive member attached to a housing of an electronic device, according to an embodiment, and FIG. 11B is a view illustrating an adhesive member and a rework member, according to an embodiment.

Referring to FIGS. 11A and 11B, an adhesive member 1150 may be attached to a battery receiving area 1184 surrounded by partitions 1182 of the housing 1180 of the electronic device 1000. The adhesive member 1150 may include a plurality of holes 1121, 1122, and 1123 and an escape area 1110.

The plurality of holes 1121, 1122, and 1123 may be formed to penetrate both the top surface of the adhesive member 1150 and the bottom surface of the adhesive member 1150 attached to the housing 1180. The plurality of holes 1121, 1122, and 1123 may include the first to third holes 1121, 1122, and 1123.

The first hole 1121 may be a hole inserted into a jig used when the adhesive member 1150 is attached to the housing 1180. In another example, the first hole 1121 may be a hole, together with the second hole 1122, in form of passing through components seated in the housing 1180 of the electronic device during manufacture.

The second hole 1122 may be disposed to be overlapped with components disposed in the housing 1180. Accordingly, the second hole 1122 may be provided in a shape to allow components disposed in the housing 1180 to pass through.

Each of a plurality of third holes 1123 may be linear. The plurality of third holes 1123 may be distributed throughout the entire area of the adhesive member 1150 and may be connected to each other. The plurality of third holes 1123 may be used as a path for the introduction/the flow of a separating liquid to be coated on the adhesive member 1150 when the adhesive member 1150 is separated from the housing 1180, for example, during repair of the electronic device. The separating liquid should be harmless to the environment and should not cause the damage to other components of the device, even if the separating liquid makes contact with the other components. In addition, the separating liquid may completely evaporate after being applied, or may be implemented by a material that is easily removable when dried. For example, the separating liquid may include alcohol. Meanwhile, when the adhesive member 1150 does not need to be separated from the housing 1180, a plurality of third holes 1123 used as the flow path of the stripping liquid may not be formed. Accordingly, the adhesive member 1150 may have various shapes.

In addition, the fifth rework area 1171 having strong adhesive surface 'SS'' may correspond to the escape area 1110 of the adhesive member 1150. The escape area 1110 of the adhesive member 1150 may be provided to facilitate the escape of the adhesive member 1150 from the strong adhesive surface 'SS' of the second rework member 1170. The escape area 1110 may be formed to have the width and the length corresponding to the strong adhesive surface 'SS'. The escape area 1110 may be formed to penetrate the top surface of the adhesive member 1150 and the bottom surface of the adhesive member 1150 attached to the housing 1180, which is similar to the plurality of holes 1121, 1122, and 1123. Accordingly, the housing 1180 exposed through the escape area 1110 may come into contact with an external surface of the fifth rework area 1171.

The strong adhesive surface 'SS' of the second rework member 1170 overlapped with the escape area 1110 may be an area separated from the housing 1180 when the battery is separated, for example during maintenance or repair. The separating force is applied to the battery by the adhesive force of the strong adhesive surface 'SS'. Accordingly, the area and the adhesive force of the strong adhesive surface 'SS' should be maintained in a specific level.

When the strong adhesive surface 'SS' has a smaller area, the adhesive force becomes weakened. Accordingly, only the second rework member 1170, which is used as the handle for a worker, may be separated from the battery when maintenance is performed. When only the second rework member 1170 is separated, the battery is not separated from the adhesive member 1150 and the first rework member 1160. Accordingly, it is difficult to dismantle the battery.

When the strong adhesive surface 'SS' is excessively large, the escape area of the adhesive member 1150 may be increased. Accordingly, the area which is occupied by the adhesive member 1150 in the battery receiving area 1184 may be reduced. Accordingly, the fixing force of the battery through the adhesive member 1150 may be weakened, thereby degrading the durability against the fixing force of the battery.

According to an embodiment, the strong adhesive surface 'SS' of the second rework member 1170 attached to the battery may be formed to have the width 'SW' of several mm in one direction (e.g., the X direction). For example, the strong adhesive surface 'SS' may be formed to have the width 'SW' ranging from 5 mm to 7 mm in a direction parallel to the direction in which the worker pulls the second rework member implementing a handle.

The second rework member 1170 may be disposed to be spaced apart from one edge of the first rework member 1160, in the direction (e.g., +Y direction) perpendicular to one direction by first spacing 'SD1' ranging several mm to several tens of mm (e.g., ranging 8 mm to 12 mm). The second rework member 1170 may be disposed to be spaced apart from an opposite edge of the first rework member 1160, in the direction (e.g., −Y direction) perpendicular to one direction by second spacing 'SD2' ranging several mm to several tens of mm (e.g., ranging 8 mm to 12 mm). The first spacing 'SD1' may be equal to or different from the second spacing 'SD2'. The strong adhesive surface 'SS' may be formed to have a length 'SL' longer than the width 'SW'. For example, the length 'SL' of the strong adhesive surface 'SS' may be equal to or longer than at least one of the first spacing 'SD1' and the second spacing 'SD2', or the sum of the first spacing 'SD1' and the second spacing 'SD2'. In this case, because the strong adhesive surface 'SS' is longitudinally formed at one side of the second rework member 1170, the separating force, which is applied when the battery is separated, may be uniformly applied to the entire surface of the first rework member 1160. Accordingly, the first rework member 1160 and the second rework member 1170 and the battery may be separated from the adhesive member 1150.

On the other hand, when the length 'SL' of the strong adhesive surface 'SS' may be less than at least one of the first spacing 'SD1' and the second spacing 'SD2', or the sum of the first spacing 'SD1' and the second spacing 'SD2', the separating force applied when the battery is separated may be concentrated onto a portion of the first rework member 1160. Accordingly, the first rework member 1160 and the battery are not separated from the adhesive member 1150, but only the second rework member 1170 may be separated.

As described above, the strong adhesive surface 'SS' formed in a longer rectangular shape having a length parallel to one side surface of a battery (e.g., the battery 400 of FIG. 5) is advantageous to disperse the concentrated stress applied to the edge of the battery, and may exhibit excellent disassembling performance.

Figure 12:
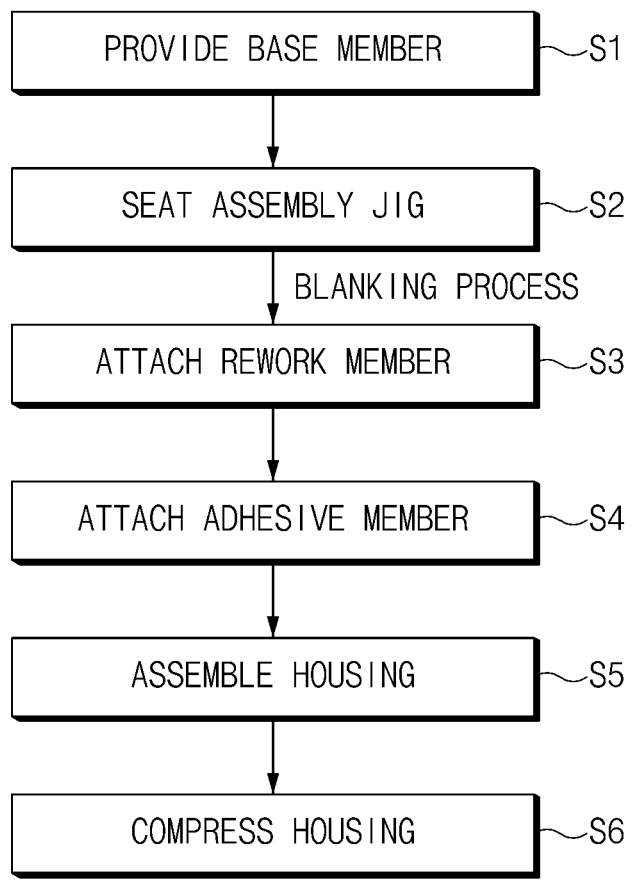
FIG. 12 is a flowchart illustrating an assembly process of a rework member and a battery attaching process, according to an embodiment.

FIG. 12 is a flowchart illustrating a method for seating a battery to which an adhesive member of an electronic device is attached, according to an embodiment.

Referring to FIG. 12, in operation S1, a base member to be implemented as the first rework member and the second rework member may be provided. The base member is initially integrated so that the first rework member and the second rework member are connected to each other without spacing therebetween. The base member may have one surface, which is an inner surface, having an adhesive property and an opposite surface, which is an outer surface, having a non-adhesive property. The base member may include a base substrate, and an adhesive layer and a non-adhesive layer sequentially stacked on the base substrate. The area, in which the non-adhesive layer is formed, may be determined depending on the contact position with the battery.

In operation S2, the provided base member may be seated on an assembly jig. The base member seated on the assembly jig may have a spacing area formed through a blanking process using a masking film. Accordingly, the base member may be divided into the first rework member and the second rework member using the blanking process. The first rework member and the second rework member may be spaced apart from each other with the spacing area interposed between the first rework member and the second rework member.

In operation S3, the battery may be seated on the inner surface of the rework member including the first rework member and the second rework member. Then, the rework member may be attached to at least four surfaces of the battery through an automatic process and/or a manual process using the assembly jig.

In operation S4, an adhesive member may be attached to one surface of the rework member which is turn is attached to the battery. In this case, the adhesive member may be a double-sided tape.

In operation S5, the housing may be assembled to provide a battery seating space. The housing is formed to have the seating surface and the plurality of partitions extending to a specific height from the seating surface of the housing, thereby providing the battery seating space.

In operation S6, the housing having a battery with an adhesive member attached to the battery mounting space may be compressed. Accordingly, the battery may be fixed into the housing through the adhesive member.

According to certain embodiments, in operation S3, the assembly jig may be used to attach the rework member around at least four surfaces of the battery.

Figure 13A:
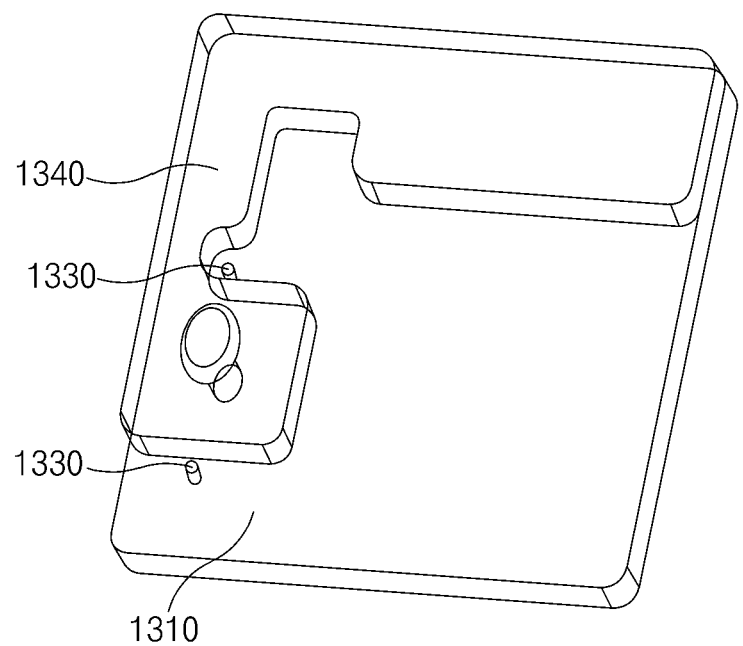
FIGS. 13A and 13B are views illustrating an attaching process of a rework member using a first assembly jig, according to an embodiment.
Figure 13B:
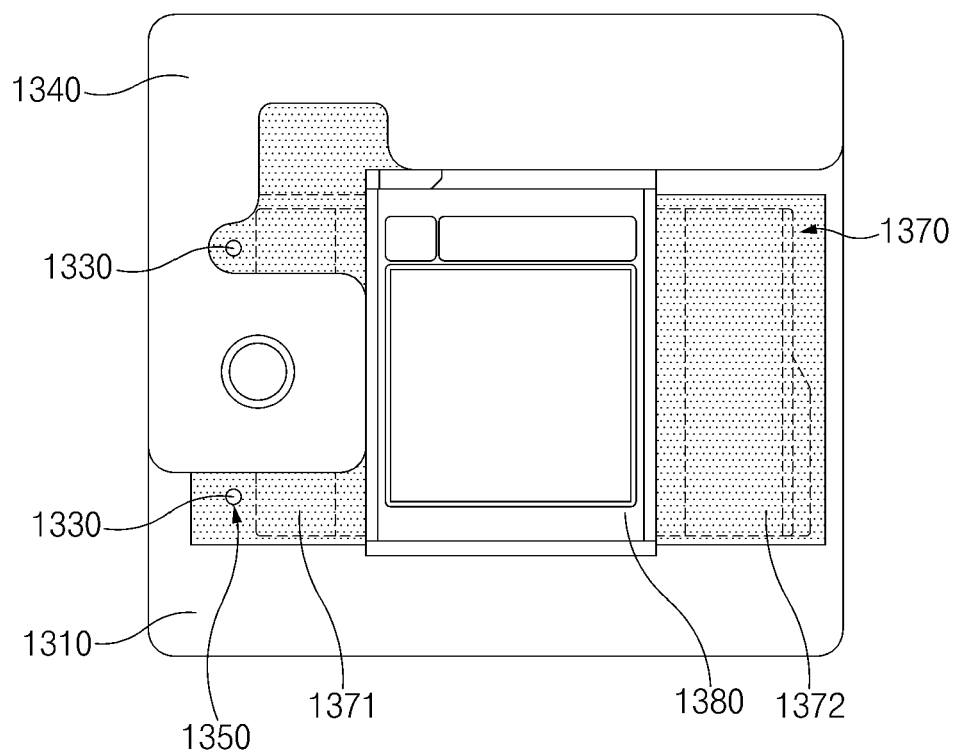
Figure 14A:
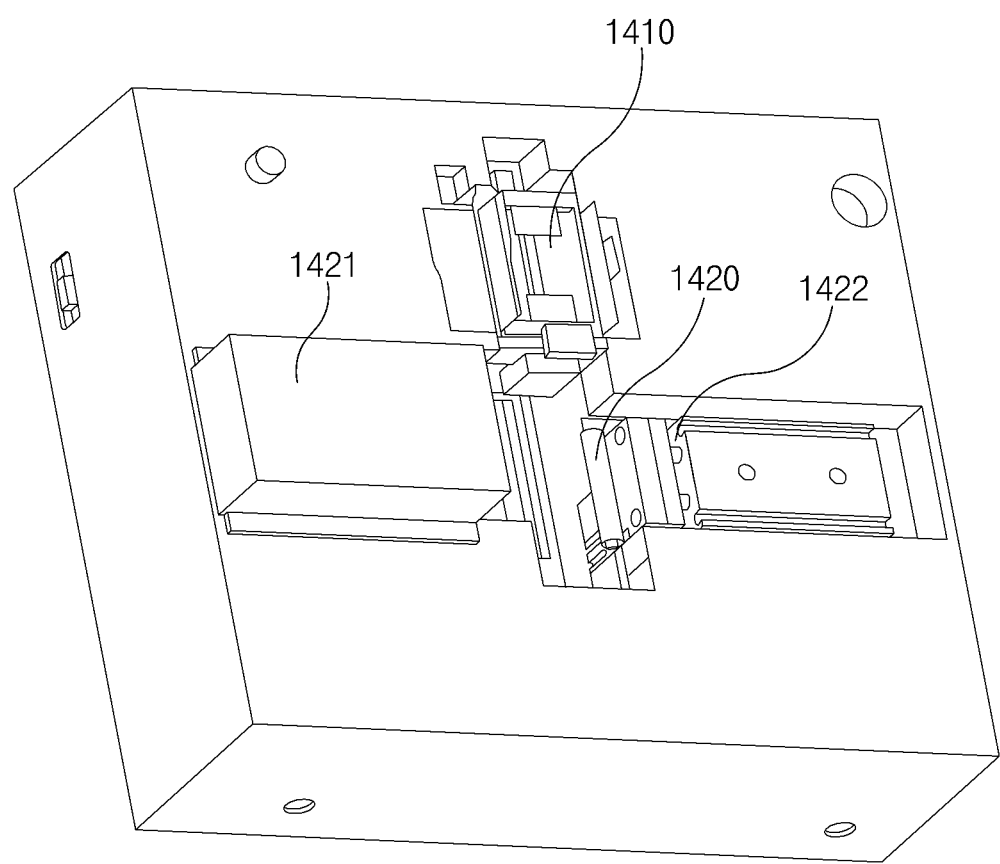
FIGS. 14A and 14B are views illustrating an attaching process of a rework member using a second assembly jig, according to an embodiment.
Figure 14B:
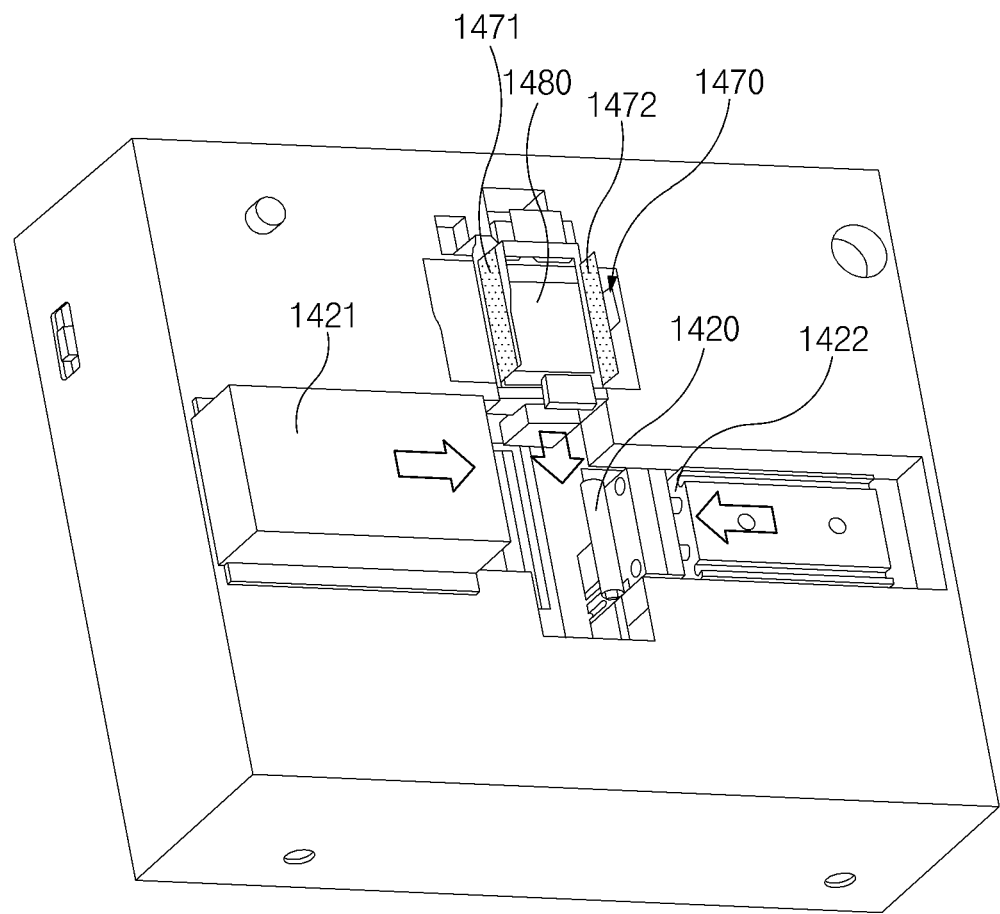
Figure 15A:
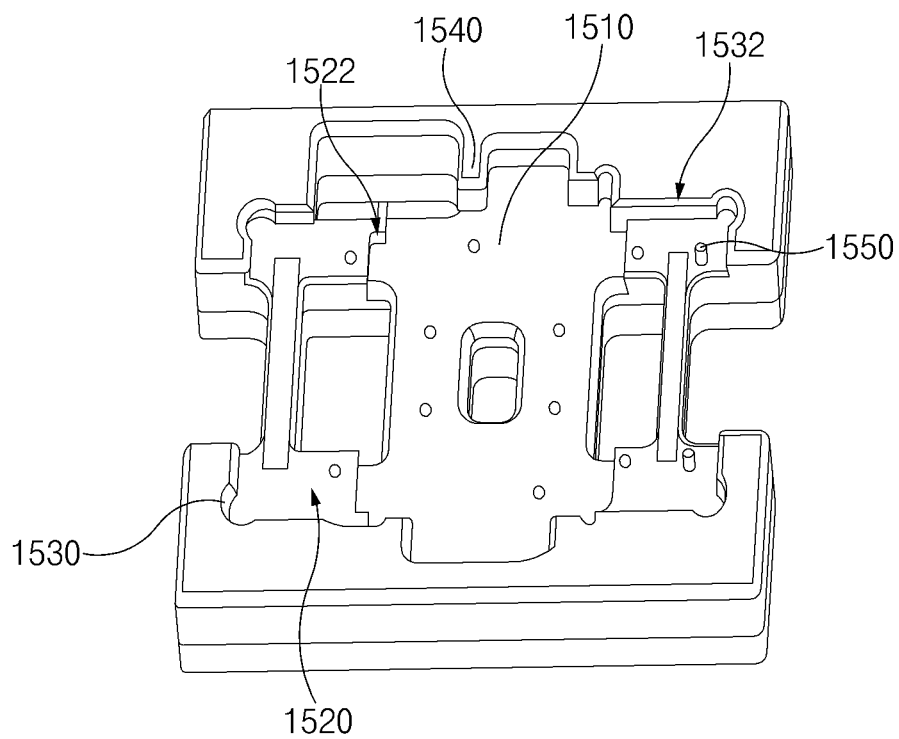
FIGS. 15A and 15B are views illustrating an attaching process of a rework member using a third assembly jig, according to an embodiment.
Figure 15B:
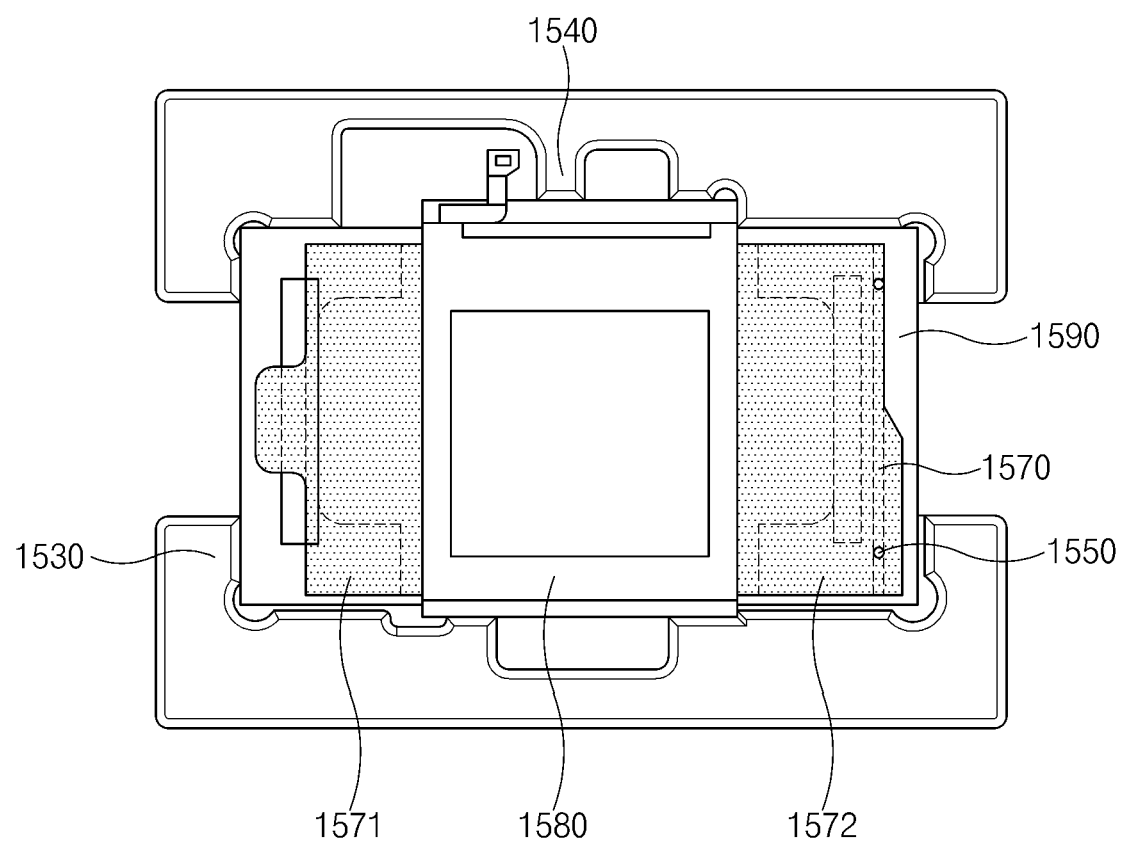

FIGS. 13A and 13B are views illustrating a method for assembling the battery and the rework member using the first assembly jig, according to an embodiment. FIGS. 14A and 14B are views illustrating a second assembly jig, according to an embodiment. FIGS. 15A and 15B are views illustrating a third assembly jig, according to an embodiment.

The rework member may be attached around at least four surfaces of the battery by using any one of the first assembly jig 1300 illustrated in FIGS. 13A and 13B, the second assembly jig 1400 illustrated in FIGS. 14A and 14B, and the third assembly jig 1500 illustrated in FIGS. 15A and 15B.

The first assembly jig 1300 illustrated in FIGS. 13A and 13B may include a support plate 1310, a fixing protrusion 1330, and a guide member 1340. Hereinafter, a method of assembling a battery 1380 and a rework member 1370 using a first assembly jig 1300 will be described. The rework member 1370 including the first and second rework members may be seated on the support plate 1310. The rework member 1370 may include a guide hole 1350. The fixing hole 1350 formed in the rework member 1370 may be coupled to the fixing protrusion 1330 formed on the support plate 1310. Accordingly, the rework member 1370 may be fixed on the support plate 1310 through the fixing protrusion 1330. The battery 1380 may be seated on the rework member 1370 fixed on the support plate 1310. As the position of the battery 1380 is aligned by the guide member 1340, the first surface of the battery 1380 may be attached to the rework member 1370. As the guide member 1340 fixed to the support plate 1310 through a hinge is opened, the battery 1380 having the first surface, to which the rework member 1370 is attached, may be separated from the first assembly jig 1300. Opposite wing area parts 1371 and 1372 (e.g., the third rework area 630 of FIG. 6) of the rework member 1370 separated from the first assembly jig 1300 may be attached to surround a second surface of the battery 1380.

A second assembly jig 1400 illustrated in FIGS. 14A and 14B is an automated attachment jig and may include a support plate 1410, a first pressing member 1421, and a second pressing member 1422. Hereinafter, a method of assembling a battery 1480 and a rework member 1470 using the second assembly jig 1400 will be described. The rework member 1470 and the battery 1480 are sequentially seated on the support plate 1410. Accordingly, a first surface of the battery 1480 may be attached to the rework member 1470. The rework member 1470, on which the battery 1480 is seated, may move into a space between the first pressing member 1421 and the second pressing member 1422. Then, opposite parts 1471 and 1472 (e.g., the third rework member 639 of FIG. 6) of the rework member 1470 may be attached to the battery 1480 till a second surface of the battery 1480, through a rolling process of a pressing roller 1420 included in the first and second pressing members 1421 and 1422.

A third assembly jig 1500 illustrated in FIGS. 15A and 15B may include a support plate 1510, and first to third guide members 1520, 1530, and 1540. The first guide member 1520 may be disposed on the base member 1510 to form a step 1522 with the base member 1510. The second guide member 1530 may be disposed on the second guide member 1530 to form a step 1532 with the first guide member 1520. The third guide member 1540 may be formed on the first guide member 1520 to be integrated with the second guide member 1530. Hereinafter, a method of assembling a battery 1580 and a rework member 1570 using a third assembly jig 1500 will be described.

A protective member 1590, a rework member 1570 including first and second rework members, and a battery 1580 may be sequentially seated on the base member 1510. The protective member 1590 may be a release paper separated from the rework member 1570. An outer surface of the rework member 1570 may be disposed to make contact with the protective member 1590, and an inner surface of the rework member 1570 may be aligned to make contact with the battery 1580.

The protective member 1590 may be guided by the second guide member 1530 to be seated on the support plate 1510 and the first guide member 1520. The rework member 1570 may be fixed by a guide protrusion 1520 disposed on the first guide member 1520 and seated on the first guide member 1520. The battery 1580 may be guided by the third guide member 1540 and disposed on the base member 1510. When the battery 1580 is seated on the rework member 1570, the rework member 1570 may be attached to the side surface of the battery 1580 as well as the bottom surface of the battery 1580, through the step 1522 between the base member 1510 and the first guide member 1520. Then, the rework member 1570 attached to the bottom surface and the side surface of the battery 1580 may be separated from the third assembly jig 1500. Opposite wing area parts 1571 and 1572 (e.g., the third rework area 630 of FIG. 6) of the rework member 1570 separated from the third assembly jig 1500 may be attached to surround a second surface of the battery 1580.

According to an embodiment, the rework member 1570 attached to the bottom surface and the side surface of the battery 1580 may be separated from the third assembly jig 1500. Opposite wing parts may be manually attached to the battery 1580 except for the bottom surface and the side surface of the rework member 1570. Accordingly, manhours may be reduced, and work may be more stably performed, such that a defective rate be reduced, as compared to when the rework member attached only to the first surface of the battery 1580 is separated from the assembly jig. In addition, the third assembly jig 1500 may reduce the manufacturing cost, as compared to that of the automated assembly jig.

According to an embodiment, when the battery 1580 is seated on the rework member 1570, the rework member 1570 deformed along the step 1522 between the base member 1510 and the first guide member 1520 may be attached to the side surface of the battery 1580. The rework member 1570 may be attached to the side surface of the battery 1560 without an additional and physical pressing member. Accordingly, the pressure is prevented from being applied to the battery 1580, such that the damage to the battery 1580 may be prevented.

Figure 16:
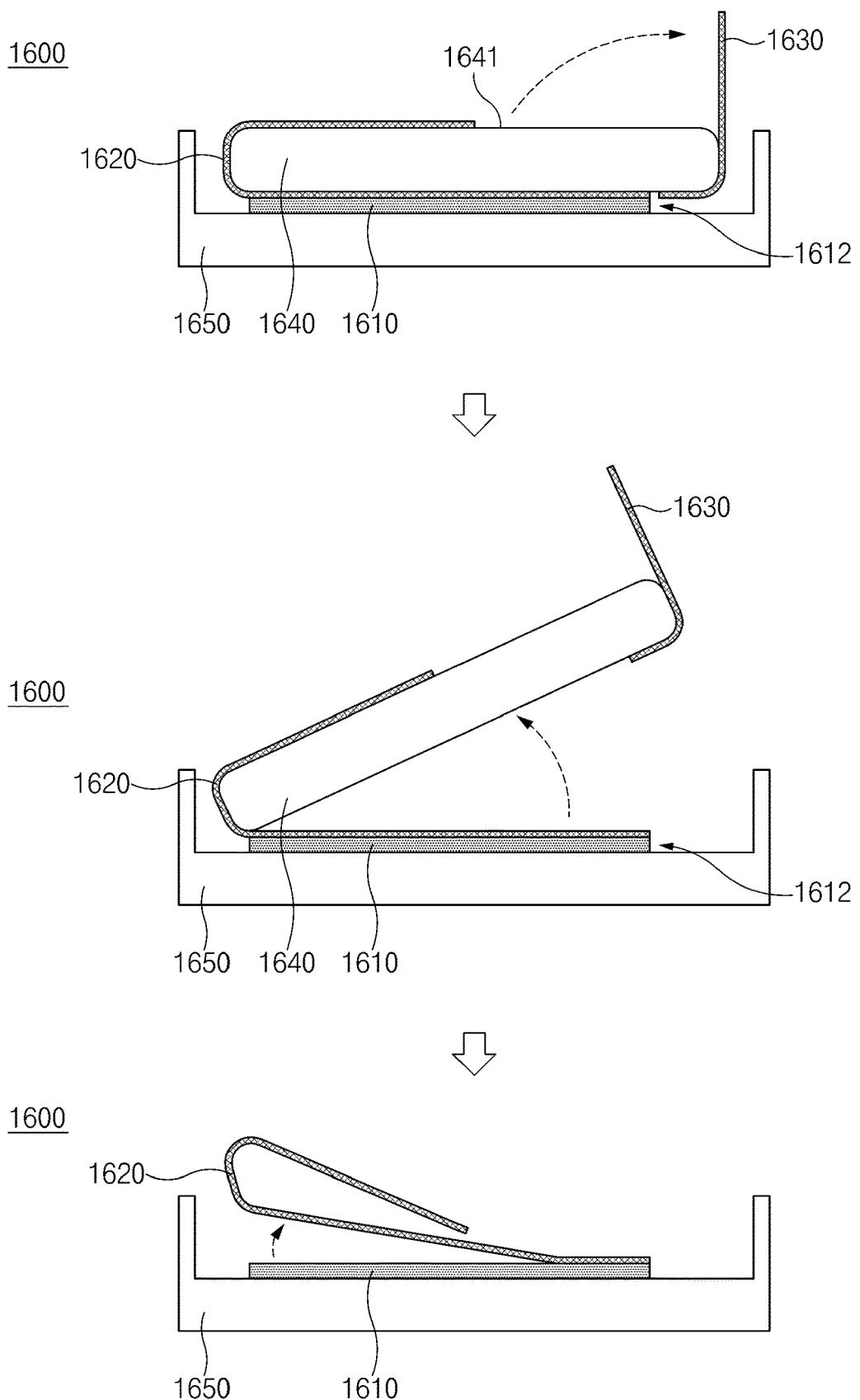
FIG. 16 is a view illustrating a process of separating a battery from an adhesive member and a rework member, according to an embodiment.

FIG. 16 is a view illustrating a method for separating a battery of an electronic device, according to an embodiment of the disclosure.

Referring to FIG. 16, when determining that maintenance of a battery 1640 attached to a housing 1650 of an electronic device 1600 is required, a worker manipulates a second rework member 1630 into an upright state such that the second rework member 1630 is separated from a second surface 1641 of the battery 1640, and grips the second rework member 1630. This way, the second rework member 1630 implements a handle. Then, the worker may pull the second rework member 1630 from one surface, which is adjacent to an escape area 1612 of the adhesive member 1610, of the housing 1650 toward an opposite surface of the housing 1650. The adhesive force between the battery 1640 and the first rework member 1620 is weaker than the adhesive force between the adhesive member 1610 and the first rework member 1620. Accordingly, the first rework member 1620 may be separated from the battery 1640. The second rework member 1630 having the strong adhesive surface may be attached to the battery 1640 until the first rework member 1620 is separated from the battery 1640. Meanwhile, the second rework member 1630 separated from the first rework member 1620 may be easily separated from the battery 1640 when the worker applies a force.

Then, the first rework member 1620 may be separated from the adhesive member 1610 and the housing 1650. In addition, the adhesive member 1610 and the first rework member 1620 may be separated from the housing 1650 together, through the separating process using the separating liquid.

According to an embodiment, an electronic device may include a housing, a battery disposed inside the housing, an adhesive member interposed between the housing and the battery and including at least one adhesive layer in absence of a base or substrate, a first adhesive cover member interposed between the adhesive member and the battery, to cover a portion of the battery, such that the first adhesive cover member is detachably attached to the battery, and a second adhesive cover member spaced apart from the first adhesive cover member to cover another portion of the battery. Adhesive force of the adhesive member is stronger than adhesive force of at least one of the first adhesive cover member or the second adhesive cover member, and a partial area of the second adhesive cover member interposed between the battery and the adhesive member has adhesive force stronger than adhesive force of a remaining area of the second adhesive cover member outside the partial area.

According to an embodiment, the adhesive member may be a double-sided tape including a single adhesive layer or multiple adhesive layers, an interface may be absent inside the adhesive member when the adhesive member includes the single adhesive layer, and each of the multiple adhesive layers included in the adhesive member may be coupled to an adjacent adhesive layer when the adhesive member includes the multiple adhesive layers.

According to an embodiment, the first adhesive cover member may have an area larger than an area of the second adhesive cover member.

According to an embodiment, the first adhesive cover member may be disposed to surround the second adhesive cover member.

According to an embodiment, the battery may include a first surface parallel to the adhesive member, a second surface facing opposite the first surface, a third surface and an opposite fourth surface connecting the first surface to the second surface, the third surface and the fourth surface being parallel to each other in a first direction, and a top surface and a bottom surface connecting the first surface to the second surface, the top surface and the bottom surface being parallel to each other in a second direction different from the first direction.

According to an embodiment, a side surface of at least one of the first adhesive cover member or the second adhesive cover member, which faces at least one of the third surface or the opposite fourth surface, has no adhesive force.

According to an embodiment, the first adhesive cover member and the second adhesive cover member may each include a weak adhesive surface and a non-adhesive surface, and the second adhesive cover member may further include a strong adhesive surface.

According to an embodiment, the first adhesive cover member may include a first cover area to cover a partial area of a first surface of the battery, a second cover area to cover a partial area of a second surface of the battery, and a third cover area connecting the first cover area to the second cover area. The second adhesive cover member may include a fifth cover area to cover a remaining area of the first surface of the battery, a sixth cover area spaced apart from the second cover area to cover another partial area of the second surface of the battery, and a seventh cover area connecting the fifth cover area to the sixth cover area.

According to an embodiment, the first adhesive cover member may further include a fourth cover area to cover the bottom surface of the battery, inner surfaces of the third cover area and the seventh cover area facing the battery may be non-adhesive surfaces, an inner surface of the fifth cover area facing the battery may be a strong adhesive surface, and inner surfaces of the first cover area, the second cover area, the fourth cover area, and the sixth cover area facing the battery may be weak adhesive surfaces.

According to an embodiment, inner surfaces of the third cover area and the seventh cover area facing the battery may be non-adhesive surfaces, an inner surface of the fifth cover area facing the battery may be a strong adhesive surface, and inner surfaces of the first cover area, the second cover area, and the sixth cover area facing the battery may be weak adhesive surfaces.

According to an embodiment, the first adhesive cover member may further include a first base film, a first adhesive layer disposed on the first base film, and a plurality of first non-adhesive layers disposed on the first adhesive layer. The second adhesive cover member may include a second base film having a thickness equal to a thickness of the first base film, a second adhesive layer disposed on the second base film, and a plurality of second non-adhesive layers disposed on the second adhesive layer.

According to an embodiment, spacing in the plurality of second non-adhesive layers disposed in an area corresponding to the weak adhesive surfaces may be smaller than spacing in the plurality of second non-adhesive layers disposed in an area corresponding to the strong adhesive surface.

According to an embodiment, a surface area of the plurality of second non-adhesive layers disposed in an area corresponding to the weak adhesive surfaces may be wider than a surface area of the plurality of second non-adhesive layers disposed in an area corresponding to the strong adhesive surface.

According to an embodiment, the adhesive member may include a plurality of pores.

According to an embodiment, the adhesive member may include an escape area corresponding to the strong adhesive surface to expose the housing, an outer surface of the first cover area may be attached to the adhesive member, and an outer surface of the fifth cover area may be attached to the housing exposed through the escape area.

According to an embodiment, a battery structure may include a battery including a first surface and a second surface facing each other, a third surface and an opposite fourth surface connecting the first surface and the second surface, and are parallel to each other in a first direction, and a top surface and a bottom surface connecting the first surface and the second surface and are parallel to each other in a second direction different from the first direction, a first adhesive cover member to cover a portion of the battery and configured to be detachably attached to the battery, and a second adhesive cover member spaced apart from the first adhesive cover member to cover another portion of the battery. A partial area of the second adhesive cover member attached to one of the first surface and the second surface of the battery may have adhesive force stronger than adhesive force of a remaining area of the second adhesive cover member outside the partial area, and inner surfaces of the first adhesive cover member and the second adhesive cover member facing at least one of the third surface or the opposite fourth surface of the battery may be non-adhesive surfaces.

According to an embodiment, the first adhesive cover member may further include a weak adhesive surface to cover a partial area of the first surface of the battery, a partial area of the second surface of the battery, and a partial area of the bottom surface of the battery, a non-adhesive surface to cover the third surface and the opposite fourth surface of the battery. The second adhesive cover member includes a weak adhesive surface to cover a remaining area of the second surface of the battery, a strong adhesive surface to cover a remaining area of the first surface of the battery, and a non-adhesive surface to cover the third surface and/or the opposite fourth surface of the battery.

According to an embodiment, the first adhesive cover member may be configured to cover more surfaces of the battery than the second adhesive cover member.

According to an embodiment, the first adhesive cover member may be disposed to surround the second adhesive cover member.

According to an embodiment, the strong adhesive surface may have an area smaller than an area of the weak adhesive surface and/or the non-adhesive surface.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via a third element.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a housing;
a battery disposed inside the housing;
an adhesive member interposed between the housing and the battery and including at least one adhesive layer in absence of a base or substrate;
a first adhesive cover member interposed between the adhesive member and the battery, configured to cover a portion of the battery, and detachably attached to the battery; and
a second adhesive cover member spaced apart from the first adhesive cover member to cover another portion of the battery,
wherein a first adhesive force of the adhesive member is stronger than a second adhesive force of the first adhesive cover member and/or a third adhesive force of the second adhesive cover member, and
wherein a partial area of the second adhesive cover member interposed between the battery and the adhesive member has a fourth adhesive force stronger than the third adhesive force of a remaining area of the second adhesive cover member outside the partial area.

2. The electronic device of claim 1, wherein the adhesive member is a double-sided tape including a single adhesive layer or multiple adhesive layers,
wherein an interface is absent inside the adhesive member when the adhesive member includes the single adhesive layer, and wherein each of the multiple adhesive layers included in the adhesive member is coupled to an adjacent adhesive layer when the adhesive member includes the multiple adhesive layers.

3. The electronic device of claim 1, wherein the first adhesive cover member has an area larger than an area of the second adhesive cover member.

4. The electronic device of claim 1, wherein the first adhesive cover member is disposed to surround the second adhesive cover member.

5. The electronic device of claim 1, wherein the battery further comprises:
   a first surface parallel to the adhesive member;
   a second surface facing opposite the first surface;
   a third surface and an opposite fourth surface connecting the first surface to the second surface, the third surface and the fourth surface being parallel to each other in a first direction; and
   a top surface and a bottom surface connecting the first surface to the second surface, the top surface and the bottom surface being parallel to each other in a second direction different from the first direction.

6. The electronic device of claim 5, wherein a side surface of the first adhesive cover member or the second adhesive cover member faces the third surface or the opposite fourth surface, and
   wherein the side surface of the first adhesive cover member or the second adhesive cover member has no adhesive force.

7. The electronic device of claim 1, wherein the first adhesive cover member and the second adhesive cover member each further comprises a weak adhesive surface and a non-adhesive surface, and
   wherein the second adhesive cover member further comprises a strong adhesive surface.

8. The electronic device of claim 1, wherein the first adhesive cover member further comprises:
   a first cover area to cover a partial area of a first surface of the battery;
   a second cover area to cover a partial area of a second surface of the battery; and
   a third cover area connecting the first cover area to the second cover area,
   wherein the second adhesive cover member further comprises:
   a fifth cover area to cover a remaining area of the first surface of the battery;
   a sixth cover area spaced apart from the second cover area and configured to cover another partial area of the second surface of the battery; and
   a seventh cover area connecting the fifth cover area to the sixth cover area.

9. The electronic device of claim 8, wherein the first adhesive cover member further comprises:
   a fourth cover area to cover a bottom surface of the battery,
   wherein inner surfaces of the third cover area and the seventh cover area facing the battery are non-adhesive surfaces,
   wherein an inner surface of the fifth cover area facing the battery is a strong adhesive surface, and
   wherein inner surfaces of the first cover area, the second cover area, the fourth cover area, and the sixth cover area facing the battery are weak adhesive surfaces.

10. The electronic device of claim 8, wherein inner surfaces of the third cover area and the seventh cover area facing the battery are non-adhesive surfaces,
   wherein an inner surface of the fifth cover area facing the battery is a strong adhesive surface, and
   wherein inner surfaces of the first cover area, the second cover area, and the sixth cover area facing the battery are weak adhesive surfaces.

11. The electronic device of claim 10, wherein the first adhesive cover member further comprises:
   a first base film;
   a first adhesive layer disposed on the first base film; and
   a plurality of first non-adhesive layers disposed on the first adhesive layer, and
   wherein the second adhesive cover member includes:
   a second base film having a thickness equal to a thickness of the first base film;
   a second adhesive layer disposed on the second base film; and
   a plurality of second non-adhesive layers disposed on the second adhesive layer.

12. The electronic device of claim 11, wherein spacing in the plurality of second non-adhesive layers disposed in an area corresponding to the weak adhesive surfaces is smaller than spacing in the plurality of second non-adhesive layers disposed in an area corresponding to the strong adhesive surface.

13. The electronic device of claim 11, wherein a surface area of the plurality of second non-adhesive layers disposed in an area corresponding to the weak adhesive surfaces is wider than a surface area of the plurality of second non-adhesive layers disposed in an area corresponding to the strong adhesive surface.

14. The electronic device of claim 9, wherein the adhesive member includes an escape area corresponding to the strong adhesive surface to expose the housing,
   wherein an outer surface of the first cover area is attached to the adhesive member, and
   wherein an outer surface of the fifth cover area is attached to the housing exposed through the escape area.

15. The electronic device of claim 1, wherein the adhesive member includes a plurality of pores.

16. A battery structure comprising:
   a battery including a first surface and a second surface facing each other, a third surface and an opposite fourth surface configured to connect the first surface and the second surface, and configured to be parallel to each other in a first direction, and a top surface and a bottom surface configured to connect the first surface and the second surface and configured to be parallel to each other in a second direction different from the first direction;
   a first adhesive cover member configured to cover a portion of the battery and configured to be detachably attached to the battery; and
   a second adhesive cover member spaced apart from the first adhesive cover member to cover another portion of the battery,
   wherein a partial area of the second adhesive cover member attached to the first surface or the second surface of the battery has a first adhesive force stronger than a second adhesive force of a remaining area of the second adhesive cover member outside the partial area, and
   wherein inner surfaces of the first adhesive cover member and the second adhesive cover member facing the third surface or the opposite fourth surface of the battery are non-adhesive surfaces.

17. The battery structure of claim 16, wherein the first adhesive cover member further comprises:

a weak adhesive surface to cover a partial area of the first surface of the battery, a partial area of the second surface of the battery, and a partial area of the bottom surface of the battery; and a non-adhesive surface to cover the third surface and the opposite fourth surface of the battery, wherein the second adhesive cover member further comprises:

a weak adhesive surface to cover a remaining area of the second surface of the battery;

a strong adhesive surface to cover a remaining area of the first surface of the battery; and a non-adhesive surface to cover the third surface and/or the opposite fourth surface of the battery.

18. The battery structure of claim 17, wherein the first adhesive cover member is configured to cover more surfaces of the battery than the second adhesive cover member.

19. The battery structure of claim 18, wherein the first adhesive cover member is disposed to surround the second adhesive cover member.

20. The battery structure of claim 17, wherein an area of the strong adhesive surface is smaller than an area of the weak adhesive surface and/or an area of the non-adhesive surface.

* * * * *